US012542348B2

(12) United States Patent
Gao et al.

(10) Patent No.: US 12,542,348 B2
(45) **Date of Patent: *Feb. 3, 2026**

(54) RADIATOR FOR PROVIDING TERAHERTZ ELECTROMAGNETIC RADIATION

(71) Applicant: City University of Hong Kong, Kowloon (HK)

(72) Inventors: Liang Gao, Kowloon (HK); Chi Hou Chan, Kowloon (HK)

(73) Assignee: City University of Hong Kong, Kowloon (HK)

( * ) Notice: Subject to any disclaimer, the term of this patent is extended or adjusted under 35 U.S.C. 154(b) by 213 days.

This patent is subject to a terminal disclaimer.

(21) Appl. No.: 18/313,677

(22) Filed: May 8, 2023

(65) Prior Publication Data

US 2024/0380102 A1 Nov. 14, 2024

(51) Int. Cl.
*H01Q 1/36* (2006.01)
*H01Q 9/04* (2006.01)
*H01Q 21/00* (2006.01)

(52) U.S. Cl.
CPC ............. *H01Q 1/36* (2013.01); *H01Q 9/0421* (2013.01); *H01Q 21/0031* (2013.01)

(58) Field of Classification Search
CPC .... H01Q 1/36; H01Q 9/0421; H01Q 21/0031; H01Q 1/02; H01Q 9/0457; H01Q 21/08; H01Q 23/00
USPC ...................................................... 331/108 R
See application file for complete search history.

(56) References Cited

U.S. PATENT DOCUMENTS

2017/0187094 A1* 6/2017 Cook .................. H01Q 1/2283
2024/0056285 A1* 2/2024 Tousi ...................... H04L 7/033
2024/0266746 A1* 8/2024 Gao ..................... H01Q 9/0421

OTHER PUBLICATIONS

X. Yi et al., “Emerging terahertz integrated systems in silicon,” IEEE Trans. Circuits Syst. I, Reg. Papers, vol. 68, No. 9, pp. 3537-3550, Sep. 2021.
P. Hillger, J. Grzyb, R. Jain, and U. R. Pfeiffer, “Terahertz imaging and sensing applications with silicon-based technologies,” IEEE Trans. THz Sci. Technol., vol. 9, No. 1, pp. 1-19, Jan. 2019.
C. Jiang et al., “A Fully Integrated 320 GHz Coherent Imaging Transceiver in 130 nm SiGe BiCMOS,” IEEE J. Solid-State Circuits, vol. 51, No. 11, pp. 2596-2609, Nov. 2016.
C. Wang and R. Han, “Dual-terahertz-comb spectrometer on CMOS for rapid, wide-range gas detection with absolute specificity,” IEEE J. Solid-State Circuits, vol. 52, No. 12, pp. 3361-3372, Dec. 2017.
I. Abdo et al., “A 300GHz-band phased-array transceiver using bi-directional outphasing and Hartley architecture in 65nm CMOS,” in IEEE Int. Solid-State Circuits Conf. (ISSCC) Dig. Tech. Papers, San Francisco, CA, USA, Feb. 2021, pp. 316-318.

(Continued)

*Primary Examiner* — Richard Tan
(74) *Attorney, Agent, or Firm* — Renner, Kenner, Greive, Bobak, Taylor & Weber

(57) ABSTRACT

A radiator for providing terahertz electromagnetic radiation. The radiator includes multiple transistor-based oscillators each operable to generate third harmonic power. The radiator also includes a patch antenna operably coupled with the transistor-based oscillators for providing terahertz electromagnetic radiation based on the third harmonic power generated by the transistor-based oscillators.

22 Claims, 21 Drawing Sheets

(56) References Cited

OTHER PUBLICATIONS

X. Yi, C. Wang, X. Chen, J. Wang, J. Grajal and R. Han, "A 220-to-320-GHz FMCW radar in 65-nm CMOS using a frequency-comb architecture," IEEE J. Solid-State Circuits, vol. 56, No. 2, pp. 327-339, Feb. 2021.
C. Wang et al., "Chip-scale molecular clock," IEEE J. Solid-State Circuits, vol. 54, No. 4, pp. 914-926, Apr. 2019.
H. Saeidi, S. Venkatesh, X. Lu and K. Sengupta, "THz prism: One-shot simultaneous multi-node angular localization using spectrum-to-space mapping with 360-to-400GHz broadband transceiver and dual-port integrated leaky-wave antennas," in IEEE Int. Solid-State Circuits Conf. (ISSCC) Dig. Tech. Papers, San Francisco, CA, USA, Feb. 2021, pp. 314-316.
M. I. W. Khan et al., "CMOS THz-ID: A 1.6-mm$^2$ package-less identification tag using asymmetric cryptography and 260-GHz far-field backscatter communication," IEEE J. Solid-State Circuits, vol. 56, No. 2, pp. 340-354, Feb. 2021.
R. Han and E. Afshari, "A CMOS high-power broadband 260-GHz radiator array for spectroscopy," IEEE J. Solid-State Circuits, vol. 48, No. 12, pp. 3090-3104, Dec. 2013.
R. Han et al., "A SiGe terahertz heterodyne imaging transmitter with 3.3 mW radiated power and fully-integrated phase-locked loop," IEEE J. Solid-State Circuits, vol. 50, No. 12, pp. 2935-2947, Dec. 2015.
R. Kananizadeh and O. Momeni, "Second-harmonic power generation limits in harmonic oscillators," IEEE J. Solid-State Circuits, vol. 53, No. 11, pp. 3217-3231, Nov. 2018.
L. Gao, H. Zhou, K. M. Shum and C. H. Chan, "A 482-GHz 2-D scalable and wideband radiator array," IEEE Microw. Wirel. Compon. Lett., vol. 31, No. 9, pp. 1090-1093, Sep. 2021.
L. Gao and C. H. Chan, "A 0.45-THz 2-D scalable radiator array with 28.2-dBm EIRP using an elliptical Teflon lens," IEEE J. Solid-State Circuits, vol. 57, No. 2, pp. 400-412, Feb. 2022.
L. Gao and C. H. Chan, "A 0.47-THz ring scalable coupled oscillator-radiator array with miniature patch antennas," IEEE Trans. Microw. Theory Techn., vol. 70, No. 8, pp. 3964-3974, Aug. 2022.
G. Guimarães and P. Reynaert, "A 670-GHz 4×2 oscillator-radiator Array Achieving 7.4-dBm EIRP in 40-nm CMOS," IEEE J. Solid-State Circuits, vol. 56, No. 11, pp. 3399-3411, Nov. 2021.
L. Gao and C. H. Chan, "A 0.68-0.72-THz 2-D scalable radiator array with -3-dBm radiated power and 27.3-dBm EIRP in 65-nm CMOS," IEEE J. Solid-State Circuits, vol. 57, No. 10, pp. 3114-3124, Oct. 2022.
K. Guo and P. Reynaert, "A 0.59THz beam-steerable coherent radiator array with 1mW radiated power and 24.1dBm EIRP in 40nm CMOS," in IEEE Int. Solid-State Circuits Conf. (ISSCC) Dig. Tech. Papers, San Francisco, CA, USA, Feb. 2020, pp. 442-444.
Y. M. Tousi, O. Momeni and E. Afshari, "A novel CMOS high-power terahertz VCO based on coupled oscillators: theory and implementation," IEEE J. Solid-State Circuits, vol. 47, No. 12, pp. 3032-3042, Dec. 2012.
M. Adnan and E. Afshari, "A 247-to-263.5 GHHz VCO with 2.6 mW peak output power and 1.14% DC-to-RF efficiency in 65 nm bulk CMOS," in IEEE Int. Solid-State Circuits Conf. (ISSCC) Dig. Tech. Papers, Feb. 2014, pp. 262-263.
Y. Zhao et al., "A 0.54-0.55 THz 2×4 coherent source array with EIRP of 24.4 dBm in 65nm CMOS technology," in IEEE MTT-S Int. Microw. Symp. Dig., Phoenix, AZ, USA, May 2015, pp. 1-3.
H. Jalili and O. Momeni, "A 0.46-THz 25-element scalable and wideband radiator array with optimized lens integration in 65-nm CMOS," IEEE J. Solid-State Circuits, vol. 55, No. 9, pp. 2387-2400, Sep. 2020.
H. Saeidi, S. Venkatesh, C. R. Chappidi, T. Sharma, C. Zhu, and K. Sengupta, "A 4×4 distributed multi-layer oscillator network for harmonic injection and THz beamforming with 14dBm EIRP at 416GHz in a lens less 65nm CMOS IC," in IEEE Int. Solid-State Circuits Conf. (ISSCC) Dig. Tech. Papers, San Francisco, CA, USA, Feb. 2020, pp. 256-258.
Y. Tousi and E. Afshari, "A high-power and scalable 2-D phased array for terahertz CMOS integrated systems," IEEE J. Solid-State Circuits, vol. 50, No. 2, pp. 597-609, Feb. 2015.
N. Buadana, S. Jameson, and E. Socher, "A multiport chip-scale dielectric resonator antenna for CMOS THz transmitters," IEEE Trans. Microw. Theory Techn., vol. 68, No. 9, pp. 3621-3632, Sep. 2020.
Z. Hu, M. Kaynak, and R. Han, "High-power radiation at 1 THz in silicon: A fully scalable array using a multi-functional radiating mesh structure," IEEE J. Solid-State Circuits, vol. 53, No. 5, pp. 1313-1327, May 2018.
H. Jalili and O. Momeni, "A 0.34-THz wideband wide-angle 2-D steering phased array in 0.13-μm SiGe BiCMOS," IEEE J. Solid-State Circuits, vol. 54, No. 9, pp. 2449-2461, Sep. 2019.
H. Jalili and O. Momeni, "A standing-wave architecture for scalable and wideband millimeter-wave and terahertz coherent radiator arrays," IEEE Trans. Microw. Theory Techn., vol. 66, No. 3, pp. 1597-1609, Mar. 2018.
H. Wang, J. Chen, J. T. S. Do, H. Rashtian, and X. Liu, "High-efficiency millimeter-wave single-ended and differential fundamental oscillators in CMOS," IEEE J. Solid-State Circuits, vol. 53, No. 8, pp. 2151-2163, Aug. 2018.
J. Chen, H. Wang, and X. Liu, "A 310-GHz fundamental oscillator with 0.4-mW output power and 3.2% dc-to-RF efficiency in 65-nm CMOS," in Proc. IEEE 20th Wireless Microw. Technol. Conf. (WAMICON), Apr. 2019, pp. 1-4.

* cited by examiner $$\begin{bmatrix} 0 & \frac{I_{1R}}{Q_1}-I_{1I} & 0 & \frac{I_{1R}+I_{2R}}{Q_3}-(I_{1I}+I_{2I}) \\ 0 & \frac{I_{1I}}{Q_1}+I_{1R} & 0 & \frac{I_{1I}+I_{2I}}{Q_3}+(I_{1R}+I_{2R}) \\ I_{2R} & 0 & -I_{2I} & \frac{I_{1R}+I_{2R}}{Q_3}-(I_{1I}+I_{2I}) \\ I_{2I} & 0 & I_{2R} & \frac{I_{1I}+I_{2I}}{Q_3}+(I_{1R}+I_{2R}) \end{bmatrix} \begin{bmatrix} R_2 \\ X_1 \\ X_2 \\ X_3 \end{bmatrix} = \begin{bmatrix} V_{1R} \\ V_{1I} \\ V_{2R} \\ V_{2I} \end{bmatrix}$$

RADIATOR FOR PROVIDING TERAHERTZ ELECTROMAGNETIC RADIATION

TECHNICAL FIELD

The invention generally relates to a radiator for providing terahertz (THz) electromagnetic radiation.

BACKGROUND

Electromagnetic radiation at terahertz frequency band may be used in various applications such as imaging, spectroscopy, communication, radar, etc.

Some existing devices use silicon-based transistors for generating electromagnetic radiation at the terahertz frequency band. Problematically, however, the terahertz frequency band usually lies beyond the maximum oscillation frequency of the silicon-based transistors so these existing devices may not be able to provide radiation in the terahertz frequency band with sufficiently high power.

SUMMARY OF THE INVENTION

In a first aspect, there is provided a radiator for providing terahertz electromagnetic radiation. The radiator includes a plurality of transistor-based oscillators each operable to generate third harmonic power, and a patch antenna operably coupled with the plurality of transistor-based oscillators for providing terahertz electromagnetic radiation based on the third harmonic power generated by the plurality of transistor-based oscillators.

The terahertz electromagnetic radiation provided by the radiator may be in the range from about 0.1 THz to about 10 THz. In some embodiments, the terahertz electromagnetic radiation is from about 0.2 THz to about 5 THz. In some embodiments, the terahertz electromagnetic radiation is from about 0.3 THz to about 3 THz. In some embodiments, the terahertz electromagnetic radiation is from about 0.3 THz to about 1 THz. In some embodiments, the terahertz electromagnetic radiation is from about 0.5 THz to about 0.7 THz. In some embodiments, the terahertz electromagnetic radiation is at about 0.6 THz.

Optionally, the patch antenna comprises an on-chip patch antenna. Optionally, the plurality of transistor-based oscillators are arranged on or in a chip of the on-chip patch antenna.

Optionally, the patch antenna is a shared aperture patch antenna with a patch arrangement, which, in plan view, is spaced apart from the oscillators.

Optionally, the patch antenna is the only patch antenna of the radiator.

Optionally, the patch antenna is the only antenna of the radiator.

In some embodiments, the patch antenna comprises a patch arrangement that consists of only one patch element. In some embodiments, the patch antenna comprises a patch arrangement that comprises multiple spaced apart patch elements or patch element portions.

Optionally, the plurality of transistor-based oscillators comprise a plurality of coupled transistor-based oscillators. In some embodiments, the plurality of coupled transistor-based oscillators are electrically coupled in parallel.

Optionally, the plurality of transistor-based oscillators each respectively comprises a transistor that includes a gate terminal, a drain terminal, and a source terminal. Optionally, the plurality of transistor-based oscillators each respectively further comprises: a gate termination arrangement electrically connected to the gate terminal, a source termination arrangement electrically connected to the source terminal, and a drain termination arrangement electrically connected to the drain terminal. The gate termination arrangement may be operable to provide an inductance at fundamental frequency. The source termination arrangement may be operable to provide a capacitance at fundamental frequency. The drain termination arrangement may be operable to provide an inductance at fundamental frequency. The capacitance and inductances may facilitate generation of third harmonic power.

Optionally, for each respective transistor-based oscillator, the gate termination arrangement, the source termination arrangement, and the drain termination arrangement are electrically connected in a T-type oscillator configuration.

Optionally, the gate termination arrangement comprises: grounded capacitor arrangement and a transmission line arrangement electrically connected between the grounded capacitor arrangement and the gate terminal of the transistor. The grounded capacitor arrangement of the gate termination arrangement is electrically connected to ground and may include one or more capacitors. The transmission line arrangement of the gate termination arrangement may include one or more transmission lines. Optionally, the transmission line arrangement of the gate termination arrangement comprises: a transmission line including an AC shorted end to which a gate bias voltage can be applied.

Optionally, for at least some of the transistor-based oscillators: the gate termination arrangements of adjacent ones of the transistor-based oscillators are integrated or combined to form an integrated or combined gate termination arrangement, and the transistors of adjacent ones of the transistor-based oscillators are coupled via respective integrated or combined gate termination arrangement. In other words, an integrated or combined gate termination arrangement ("A") is disposed between every two transistors ("B") in the form of " . . . B-A-B-A-B . . . ".

Optionally, the integrated or combined gate termination arrangement comprises: a grounded capacitor arrangement and a transmission line arrangement electrically connected between the grounded capacitor arrangement and the gate terminals of two adjacent transistors. The grounded capacitor arrangement of the integrated or combined gate termination arrangement is electrically connected to ground and may include one or more capacitors. The transmission line arrangement of the integrated or combined gate termination arrangement may include one or more transmission lines. Optionally, the transmission line arrangement of the integrated or combined gate termination arrangement comprises: a transmission line including an AC shorted end to which a gate bias voltage can be applied.

Optionally, the source termination arrangement comprises: a grounded capacitor arrangement electrically connected with the source terminal of the transistor, and a transmission line arrangement electrically connected with the source terminal of the transistor. The grounded capacitor arrangement of the source termination arrangement is electrically connected to ground and may include one or more capacitors. The one or more capacitors may include a parallel plate capacitor. The transmission line arrangement of the source termination arrangement may include one or more transmission lines. Optionally, the transmission line arrangement of the source termination arrangement comprises a grounded transmission line.

Optionally, the drain termination arrangement comprises a transmission line arrangement electrically connected with the drain terminal of the transistor. The transmission line arrangement of the drain termination arrangement may include one or more transmission lines. Optionally, the transmission line arrangement of the drain termination arrangement comprises: a transmission line including an AC shorted end to which a supply voltage can be applied, and a plurality of feed lines capacitively coupled to the patch antenna. The plurality of feed lines may include at least a first feed line and a second feed line disposed generally in parallel. The transmission line of the drain termination arrangement may be disposed between the first feed line and the second feed line. The transmission line of the drain termination arrangement, the first feed line, and the second feed line may generally elongate along the same direction. The first and second feed lines may have substantially the same length. The transmission line may be shorter than each of the first and second feed lines.

Optionally, the gate termination arrangement comprises a first transmission line arrangement, the source termination arrangement comprises a second transmission line arrangement, and the drain termination arrangement comprises a third transmission line arrangement. The first transmission line arrangement, the second transmission line arrangement, and the third transmission line arrangement may be disposed such that in plan view they generally elongate along the same direction.

The transistor may also include a buck terminal, and the transistor-based oscillator may also include a buck termination arrangement electrically connected to the buck terminal. In some embodiments, the buck termination arrangement comprises a grounded resistor arrangement, i.e., a resistor arrangement electrically connected to ground and includes one or more resistors.

Optionally, the plurality of transistor-based oscillators comprise: a first plurality of coupled transistor-based oscillators operable to oscillate in phase at fundamental frequency and a second plurality of coupled transistor-based oscillators operable to oscillate in phase at fundamental frequency. In some embodiments, the first plurality of coupled transistor-based oscillators and the second plurality of coupled transistor-based oscillators have the same number of transistor-based oscillators. Optionally, the radiator further comprises a coupler arrangement coupling the first plurality of coupled transistor-based oscillators and the second plurality of coupled transistor-based oscillators such that the third harmonic power generated by the first plurality of coupled transistor-based oscillators and the third harmonic power generated by the second plurality of coupled transistor-based oscillators are differentially fed to the patch antenna.

Optionally, for the first plurality of coupled transistor-based oscillators: adjacent ones of the transistors are coupled by respective integrated or combined gate termination arrangement. In other words, for the first plurality of coupled transistor-based oscillators, an integrated or combined gate termination arrangement ("A") is disposed between every two transistors ("B") in the form of " . . . B-A-B-A-B . . . ".

Optionally, for the second plurality of coupled transistor-based oscillators: adjacent ones of the transistors are coupled by respective integrated or combined gate termination arrangement. In other words, for the second plurality of coupled transistor-based oscillators, an integrated or combined gate termination arrangement ("A") is disposed between every two transistors ("B") in the form of " . . . B-A-B-A-B . . . ".

Optionally, the coupler arrangement comprises: a first coupler coupling one (the end one) of the first plurality of coupled transistor-based oscillators with one (the end one) of the second plurality of coupled transistor-based oscillators and a second coupler coupling another (the other end one) of the first plurality of coupled transistor-based oscillators with another (the other end one) of the second plurality of coupled transistor-based oscillators. The first coupler may be provided by a coupling transmission line arrangement. The second coupler may be provided by a coupling transmission line arrangement.

Optionally, the patch antenna comprises a patch arrangement. Optionally, in plan view, the plurality of transistor-based oscillators are disposed around a patch arrangement of the patch antenna. In some embodiments, in plan view, the plurality of transistor-based oscillators comprise: a first plurality of transistor-based oscillators disposed on a first side of the patch and a second plurality of transistor-based oscillators disposed on a second side of the patch opposite the first side.

Optionally, in plan view: the first plurality of transistor-based oscillators are disposed in a first substantially linear array and the second plurality of transistor-based oscillators are disposed in a second substantially linear array spaced apart from and generally parallel to the first substantially linear.

Optionally, the first plurality of transistor-based oscillators and the second plurality of transistor-based oscillators have the same number of transistor-based oscillators, and, in plan view, each one of the first plurality of transistor-based oscillators is aligned with a respective one of the second plurality of transistor-based oscillators.

Optionally, the radiator is fabricated using CMOS technologies, such as 65-nm CMOS process/technology.

Optionally, the radiator is arranged in, or formed in, an integrated circuit (chip). The terahertz electromagnetic radiation may radiate from one side (e.g., the front side) of the integrated circuit (chip).

Optionally, the radiator is a terahertz electromagnetic radiation radiator configured for providing terahertz electromagnetic radiation only. Optionally, the radiator is configured for providing terahertz electromagnetic radiation as well as electromagnetic radiation in one or more other frequencies or frequency bands. In some embodiments in which the radiator is configured for providing terahertz electromagnetic radiation as well as electromagnetic radiation in one or more other frequencies or frequency bands, the radiator may operate best for providing terahertz electromagnetic radiation.

In a second aspect, there is provided an integrated circuit (chip) with at least one of the radiator of the first aspect.

In a third aspect, there is provided a device for providing terahertz electromagnetic radiation comprising at least one of the radiator of the first aspect.

Optionally, the device further comprises a lens disposed relative to the radiator for affecting (e.g., boosting) directivity of the terahertz electromagnetic radiation provided or radiated by the radiator. The lens may be a polytetrafluoroethylene (PTFE) lens, a dielectric lens, etc. The lens may comprise a curved boundary surface, such as a convex boundary surface or a concave boundary surface. In one example, the lens comprises an ellipsoidal or part-ellipsoidal (e.g., truncated ellipsoidal) boundary surface.

Optionally, the radiator may be arranged in, or formed in, an integrated circuit (chip), the device further comprises a substrate, and the integrated circuit (chip) is arranged on one side of the substrate. The substrate may include, e.g., a printed circuit board (PCB).

Optionally, the device further comprises a support structure supporting the lens relative to (e.g., above) the radiator. The support structure may be additively manufactured.

Optionally, the device further comprises a thermal management device thermally coupled with the radiator for regulating temperature of (e.g., facilitate cooling of) the radiator. In some embodiments, the thermal management device comprises a passive thermal management device. For example, the passive thermal management device may include a heat sink with fins, pins, etc. In some embodiments, the thermal management device comprises an active thermal management device. For example, the active thermal management device may include a fan, a liquid-based heat exchange device, an evaporative heat exchanger, etc.

In a fourth aspect, there is provided a system for providing terahertz electromagnetic radiation, comprising at least one of the radiator of the first aspect. The system may be a sensing system, a communication system, a spectroscopic system, an imaging system, etc. In one example, the system is an active terahertz imaging system arranged to illuminate objects (e.g., targeted objects). In one example, the system is a cellular (e.g., 5G, 6G, above 6G, or the like) communication system.

In a fifth aspect, there is provided a system for providing terahertz electromagnetic radiation, comprising at least one of the integrated circuit (chip) of the second aspect. The system may be a sensing system, a communication system, a spectroscopic system, an imaging system, etc. In one example, the system is an active terahertz imaging system arranged to illuminate objects (e.g., targeted objects). In one example, the system is a cellular (e.g., 5G, 6G, above 6G, or the like) communication system.

In a sixth aspect, there is provided a system for providing terahertz electromagnetic radiation, comprising at least one of the device of the third aspect. The system may be a sensing system, a communication system, a spectroscopic system, an imaging system, etc. In one example, the system is an active terahertz imaging system arranged to illuminate objects (e.g., targeted objects). In one example, the system is a cellular (e.g., 5G, 6G, above 6G, or the like) communication system.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical condition(s), etc. For example, the expression "generally elongate" or "generally extend" refers to the generally tendency to elongate or extend, and does not require strict elongation or extension along a single direction. For example, the expression "generally parallel" are used to mean that strictly parallel is not essential. In some embodiments, when a value is modified by terms of degree, such as "about", such expression may include the stated value ±20%, ±10%, ±5%, ±2%, or ±1%.

Unless otherwise specified, the terms "connected", "coupled", "mounted" or the like, are intended to encompass both direct and indirect connection, coupling, mounting, etc.

BRIEF DESCRIPTION OF THE DRAWINGS

Embodiments of the invention will now be described, by way of example, with reference to the accompanying drawings, in which.

DETAILED DESCRIPTION

Figure 1:
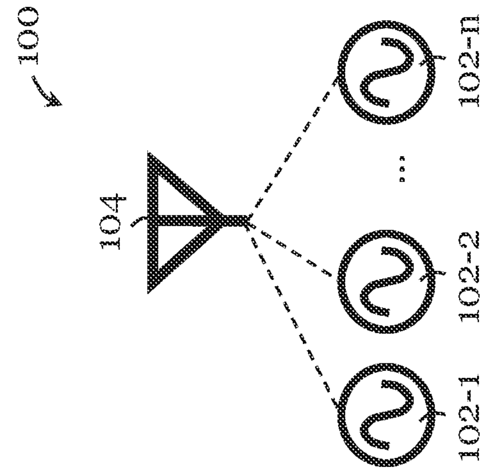
FIG. 1 is a schematic diagram of a radiator for providing terahertz electromagnetic radiation in embodiments of the invention.

FIG. 1 shows a radiator 100 for providing terahertz electromagnetic radiation in some embodiments of the invention.

The radiator 100 includes n (n≥2) transistor-based oscillators 102-1, 102-2, . . . , **102-*n* each operable to generate third harmonic power. The radiator 100 also includes a patch antenna 104 operably coupled with the transistor-based oscillators 102-1, 102-2, . . . , 102-*n* for providing terahertz electromagnetic radiation based on the third harmonic power generated by the transistor-based oscillators 102-1, 102-2, . . . , 102-*n*. The terahertz electromagnetic radiation may include any electromagnetic radiation from about 0.1 THz to about 10 THz, e.g., from about 0.2 THz to about 5 THz, from about 0.3 THz to about 3 THz, from about 0.3 THz to about 1 THz, from about 0.5 THz to about 0.7 THz, or at about 0.6 THz. In some embodiments, the radiator 100 is a terahertz electromagnetic radiation radiator configured for providing terahertz electromagnetic radiation only. In some embodiments, the radiator 100** is configured for providing terahertz electromagnetic radiation as well as electromagnetic radiation in one or more other frequencies or frequency bands.

In some embodiments, the transistor-based oscillators 102-1, 102-2, . . . , **102-*n* may be coupled transistor-based oscillators. For example, the transistor-based oscillators 102-1, 102-2, . . . , 102-*n* may be electrically coupled in parallel. The transistor-based oscillators 102-1, 102-2, . . . , 102-*n*** may have similar electrical and/or mechanical construction.

Figure 2:
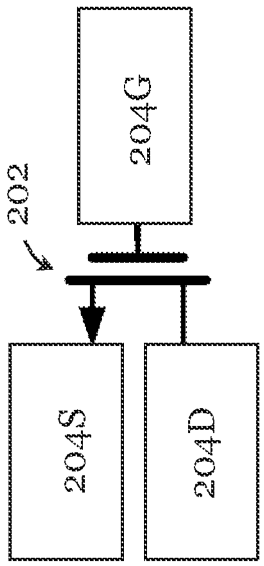
FIG. 2 is a schematic diagram of a transistor-based oscillator of the radiator of FIG. 1 in some embodiments of the invention.

FIG. 2 shows an example construction of the transistor-based oscillators 102-1, 102-2, . . . , **102-*n* of the radiator 100. In some embodiments, all of the transistor-based oscillators 102-1, 102-2, . . . , 102-*n* of the radiator 100 have the construction of the transistor-based oscillator 200**.

Referring to FIG. 2, the transistor-based oscillator 200 includes a transistor 202 with a gate terminal, a drain terminal, and a source terminal. The transistor-based oscillator 200 also includes a gate termination arrangement 204G electrically connected to the gate terminal of the transistor 202, a source termination arrangement 204S electrically connected to the source terminal of the transistor 202, and a drain termination arrangement 204D electrically connected to the drain terminal of the transistor 202. The gate termination arrangement 2004G may be operable to provide an inductance at fundamental frequency. The source termination arrangement 204S may be operable to provide a capacitance at fundamental frequency. The drain termination arrangement 204D may be operable to provide an inductance at fundamental frequency. These capacitance and inductances may facilitate generation of third harmonic power.

In some embodiments, the gate termination arrangement 204G, the source termination arrangement 204S, and the drain termination arrangement 204D are electrically connected in a T-type oscillator configuration. Each of the gate termination arrangement 204G, the source termination arrangement 204S, and the drain termination arrangement 204D may be provided at least partly by a transmission line arrangement (with one or more transmission lines).

In some embodiments, the gate termination arrangement 204G includes a grounded capacitor arrangement and a transmission line arrangement electrically connected between the grounded capacitor arrangement and the gate terminal of the transistor 202. The grounded capacitor arrangement may include one or more capacitors. The transmission line arrangement of the gate termination arrangement 204G may include one or more transmission lines. In some embodiments, the transmission line arrangement of the gate termination arrangement 204G has a transmission line including an AC shorted end to which a gate bias voltage for the transistor 202 can be applied.

In some embodiments, for at least some of the transistor-based oscillators 102-1, 102-2, . . . , **102-*n* that have the construction of the transistor-based oscillator 200: the gate termination arrangements 204G of adjacent ones of these transistor-based oscillators are integrated or combined to form an integrated or combined gate termination arrangement, and the transistors 202 of adjacent ones of these transistor-based oscillators are coupled via respective integrated or combined gate termination arrangement. In other words, an integrated or combined gate termination arrangement ("A") is disposed between every two transistors 202 ("B"), in the form of " . . . B-A-B-A-B . . . ". Like the gate termination arrangement 204G, the integrated or combined gate termination arrangement may include a grounded capacitor arrangement and a transmission line arrangement electrically connected between the grounded capacitor arrangement and the gate terminals of two adjacent transistors 202**. The grounded capacitor arrangement of the integrated or combined gate termination arrangement may include one or more capacitors. The transmission line arrangement of the integrated or combined gate termination arrangement may include one or more transmission lines. In some embodiments, the transmission line arrangement of the integrated or combined gate termination arrangement has a transmission line including an AC shorted end to which a gate bias voltage can be applied.

In some embodiments, the source termination arrangement 204S includes a grounded capacitor arrangement electrically connected with the source terminal of the transistor, and a transmission line arrangement electrically connected with the source terminal of the transistor. The grounded capacitor arrangement of the source termination arrangement 204S may include one or more capacitors, e.g., a parallel plate capacitor. The transmission line arrangement of the source termination arrangement 204S may include one or more transmission lines. In some embodiments, the transmission line arrangement of the source termination arrangement 204S has a grounded transmission line.

In some embodiments, the drain termination arrangement 204D includes a transmission line arrangement electrically connected with the drain terminal of the transistor. The transmission line arrangement of the drain termination arrangement 204D may include one or more transmission lines. In some examples, the one or more transmission lines include a transmission line with an AC shorted end to which a supply voltage can be applied, and feed lines capacitively coupled to the patch antenna. In some embodiments, the feed lines may be disposed generally in parallel. In some embodiments the transmission line of the drain termination arrangement 204D may be disposed between two feed lines. In some embodiments, the transmission line of the drain termination arrangement 204D and the feed lines may generally elongate along the same direction. The feed lines may have substantially the same length. The transmission line may be shorter than each of the feed lines.

Although not illustrated in FIG. 2, in some embodiments, the transistor 202 may also include a buck terminal, and the transistor-based oscillator may also include a buck termination arrangement electrically connected to the buck terminal of the transistor 202. In some embodiments, the buck termination arrangement may include a grounded resistor arrangement, i.e., a resistor arrangement electrically connected to ground and includes one or more resistors.

Referring back to FIG. 1, in some embodiments, the transistor-based oscillators 102-1, 102-2, . . . , **102-*n* include a first set of multiple coupled transistor-based oscillators operable to oscillate in phase at fundamental frequency and a second set of multiple coupled transistor-based oscillators operable to oscillate in phase at fundamental frequency. The two sets of transistor-based oscillators may have the same number of transistor-based oscillators. In some examples, for each of one or both sets of coupled transistor-based oscillators: adjacent ones of the transistors 202 are coupled by respective integrated or combined gate termination arrangement such that an integrated or combined gate termination arrangement ("A") is disposed between every two transistors 202 ("B") in the form of " . . . B-A-B-A-B . . . ". The radiator 100 may include a coupler arrangement electrically coupling the two sets of coupled transistor-based oscillators such that the third harmonic power generated by the two sets of coupled transistor-based oscillators are differentially fed to the patch antenna 104**. The coupler arrangement may include two couplers, e.g., two coupling transmission line arrangements. Each of the couplers coupling one transistor-based oscillator (e.g., the one connected at an end) of one set to one transistor-based oscillator of another set (e.g., the one connected at an end).

In some embodiments, the patch antenna 104 is a shared aperture patch antenna with a patch arrangement. The patch arrangement, in plan view, is spaced apart from the oscillators 102-1, 102-2, . . . , **102-*n*. In some embodiments, the patch antenna 104 is an on-chip patch antenna and the transistor-based oscillators are arranged on or in a chip of the on-chip patch antenna. In some embodiments, the patch antenna 104 may be the only patch antenna of the radiator 100 or even the only antenna of the radiator 100. In some embodiments, the patch antenna 104** may have a patch arrangement with one or more patch elements (or patch element portions).

In some embodiments, the radiator 100 is fabricated using CMOS technologies, such as 65-nm CMOS process/technology. The radiator 100 may be arranged in, or formed in, an integrated circuit (chip). The terahertz electromagnetic radiation may radiate from one side (e.g., the front side) of the integrated circuit (chip) or radiator 100.

The following description provides some example embodiments of the radiator 100 of FIG. 1 and related devices. It should be appreciated that the invention is not limited to these embodiments.

Inventors of the present invention have realized that transistor-based oscillator can be used to generate terahertz frequency. Inventors of the present invention have appreciated that when the fundamental oscillation frequency of the oscillator is near the maximum oscillation frequency ($f_{max}$) of the CMOS process for the transistor, the oscillation amplitude would be too small to drive a high harmonic output, and, while choosing a high harmonic order may provide improved performance for a high output frequency (e.g., beyond 500 GHz), the output power of a single harmonic oscillator is still quite limited.

Inventors of the present invention are aware of some existing designs that address this problem by coupling multiple oscillators and by using an on-chip power combiner. However, in these designs, the total number of coupled oscillators may be limited as a multi-way on-chip power combiner could be quite lossy and may impede the increase in power when more oscillators are coupled. Some other existing designs address this problem by using an on-chip antenna for spatial power combining. However, in these designs, on-chip slot antenna is designed on the silicon substrate, and a relatively expensive silicon lens is usually required to mitigate the surface waves and improve the efficiency and radiation pattern. In L. Gao et al., A 0.45-THz 2-D scalable radiator array with 28.2-dBm EIRP using an elliptical Teflon lens (2022), the silicon lens is removed, and the silicon substrate thickness and antenna spacing are designed to provide desirable radiation performance. However, as the substrate of the chip is used for wave radiation, it cannot be readily attached to a heat sink for heat dissipation, which could be problematic for a large array with high DC power consumption. Radiating waves from the front side of the chip using an on-chip patch antenna may solve this problem, but usually patch antenna is much larger than slot antenna, and the bandwidth and radiation efficiency may be limited. In L. Gao et al., A 0.47-THz ring scalable coupled oscillator-radiator array with miniature patch antennas (2022), there is provided a miniature patch antenna to improve the area efficiency, i.e., radiated power per area. However, the radiation efficiency is limited. A quartz superstrate is used to improve the efficiency, but that requires the extra package procedure and a well-cut quartz superstrate. The bandwidth obtained is also limited, which makes the design susceptible to process variation and inaccurate modeling.

To address the above issues, some embodiments of the invention provide a shared aperture patch-antenna-based radiator. In some embodiments, the radiator extracts third harmonic power for high output frequency, in one example at about 600 GHz. In some embodiments, the shared aperture patch antenna may be used as an on-chip power combiner for a tightly-spaced coupled oscillator-based feed source to realize high radiated power. The radiation efficiency of the patch antenna may be improved by using a shared patch antenna with a long width. In some embodiments, a capacitive feed method is applied to extend the bandwidth for a more robust third harmonic extraction. Some embodiments of the radiator can achieve a high area efficiency even utilizing a patch antenna for front-side radiation without extra antenna packaging.

Inventors of the present invention have devised that increasing the size of the transistor may increase the output power of a transistor-based oscillator. However, a large-size transistor may lead to scale down of the required inductance for sustaining oscillation. The required inductor may be of lower quality, which results in low signal generation efficiency. Also, a large-size transistor may have a large parasitic capacitance, exhibiting a low impedance at high harmonic frequency, which reduces harmonic output power.

Inventors of the invention have devised that oscillator coupling, in particular coupling of multiple transistor-based oscillators, may increase the total number of transistors hence improve the output power.

Figure 3:
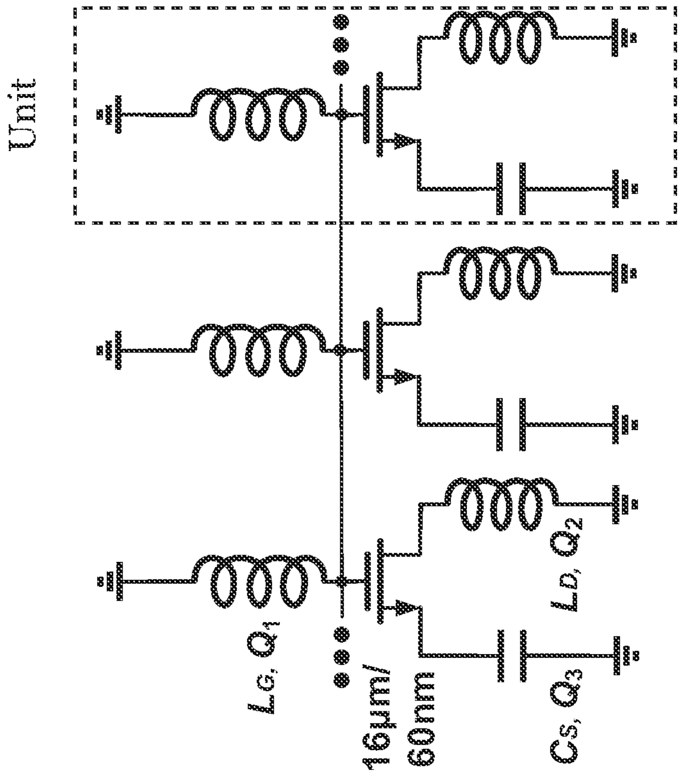
FIG. 3 is a schematic circuit diagram illustrating an AC equivalent circuit of multiple in-proximity coupled oscillators in one embodiment of the invention.

FIG. 3 shows an AC equivalent circuit of multiple in-proximity connected parallel coupled oscillators in one embodiment. Each single-end unit oscillator may be based on the T-embedding topology, which can be synthesized for high-power fundamental or harmonic terahertz signal generation. As shown in FIG. 3, the unit oscillator is constructed by adding three termination arrangements to the gate, drain, and source of the transistor. The unit oscillator ("unit" in FIG. 3) is suitable for parallel coupling through the gate termination. The coupling in FIG. 3 is based on the connection through the same node (which is connected with the gates of the transistors). While in theory the number of coupling units can be arbitrary, in practice there exists a spacing between adjacent oscillator units connected by a transmission line and such finite spacing should be minimized to reduce the potential coupling phase error from the device mismatch.

Figure 4A:
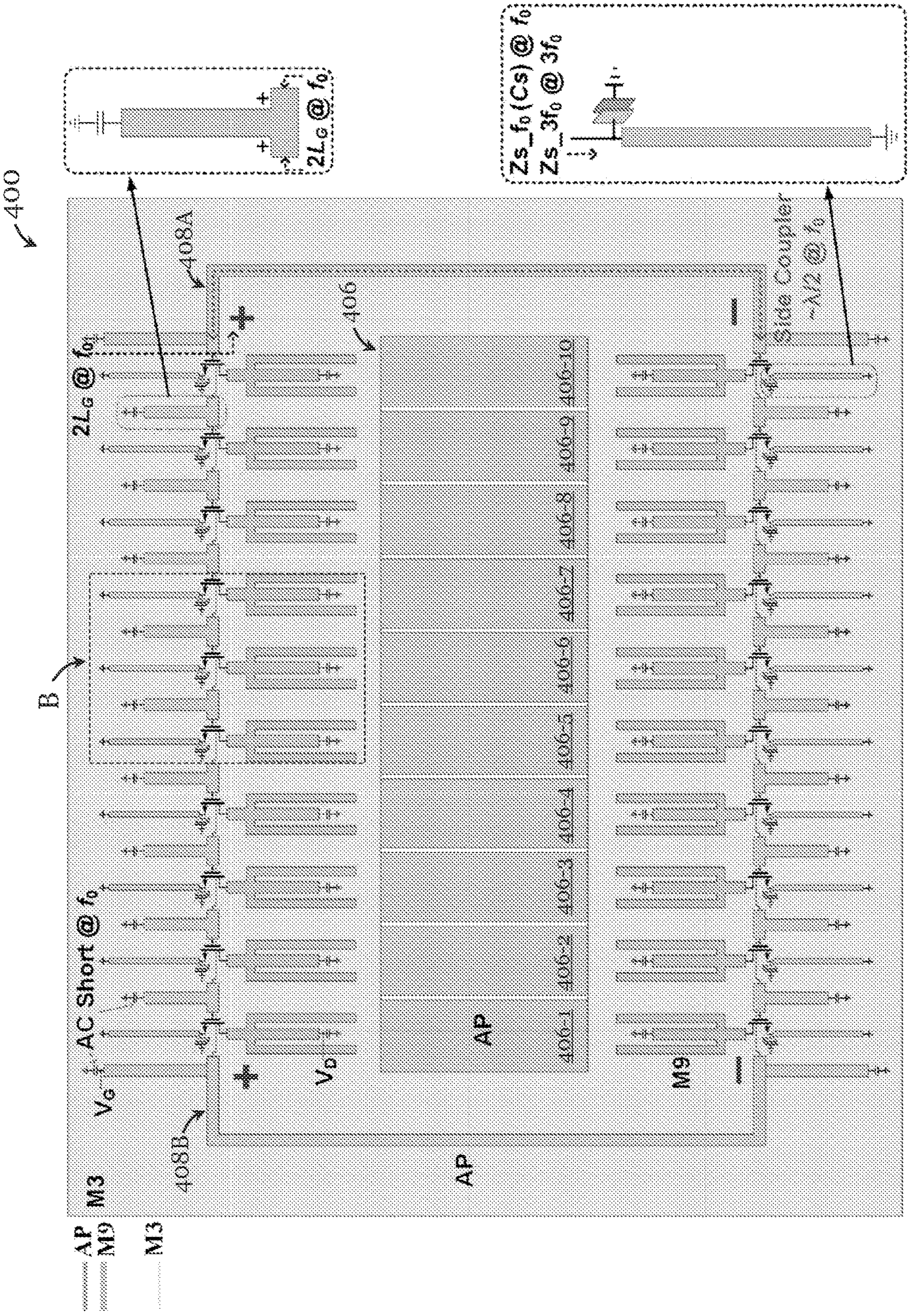
FIG. 4A is a schematic diagram of a radiator for providing terahertz electromagnetic radiation in one embodiment of the invention.
Figure 4B:
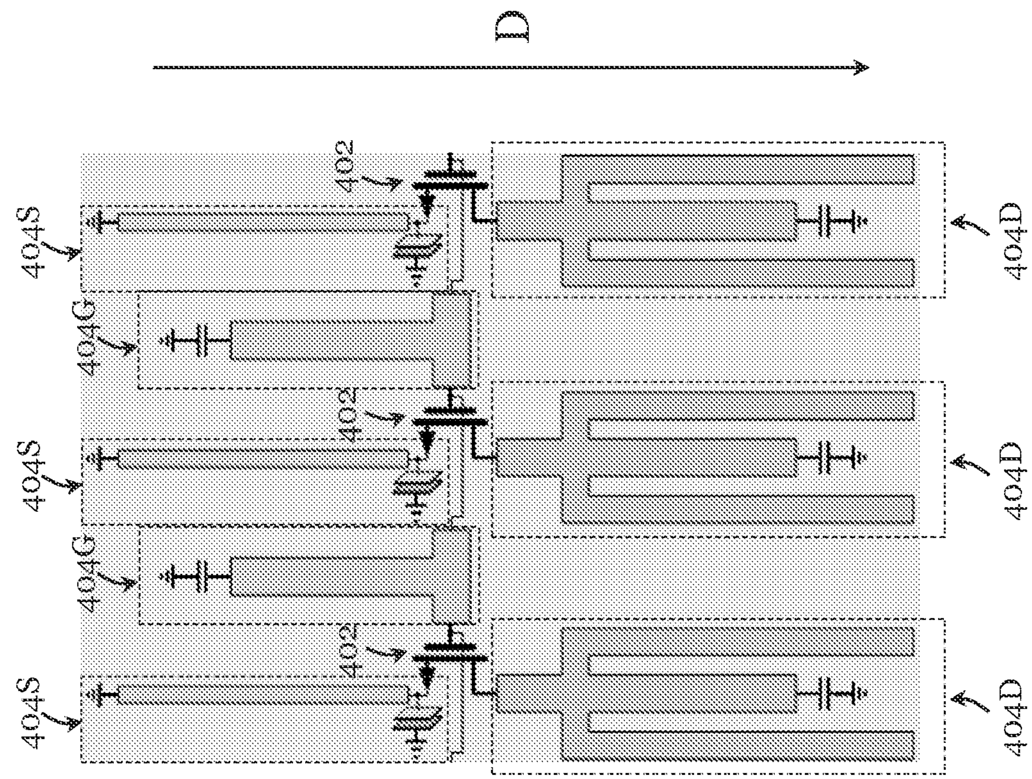
FIG. 4B is an enlarged view of part B of the radiator of FIG. 4A.

FIG. 4A shows a radiator 400 for providing terahertz electromagnetic radiation in one embodiment of the invention. FIG. 4B shows a portion B of the radiator 400 in greater detail.

As shown in FIG. 4A, the radiator 400 generally includes multiple oscillators each operable to generate third harmonic power, and a patch antenna operably coupled with the oscillators for providing terahertz electromagnetic radiation based on the third harmonic power generated by the oscillators.

In this embodiment, the patch antenna is an on-chip patch antenna and the oscillators are arranged on or in a chip of the on-chip patch antenna. As shown in FIG. 4A, the patch antenna is a shared aperture patch antenna with a patch arrangement 406, which, in plan view, is spaced apart from the oscillators. In this embodiment, the patch arrangement 406 includes ten spaced apart patch element portions 406-1 to 406-10.

In this embodiment, the oscillators include coupled oscillators electrically coupled in parallel. As shown in FIG. 4A, in plan view, the oscillators include two sets of oscillators disposed on opposite sides of the patch arrangement 406. Each set of oscillators includes a substantially linear array of oscillators. The two sets of oscillators have the same number of oscillators, and each oscillator in one set is generally aligned with another oscillator in another set (and a corresponding patch element portion 406-1 to 406-10). The oscillators in each set of the coupled oscillators are operable to oscillate in phase at fundamental frequency. The two sets of coupled oscillators are connected with each other via coupling transmission lines 408A, 408B connecting the ends of the two sets. The coupling transmission lines 408A, 408B are arranged to couple the two sets of coupled oscillators such that the third harmonic power generated by the two sets can be differentially fed to the patch antenna.

The construction of the two sets of oscillators are generally the same. As shown in FIG. 4B, the coupled oscillators include multiple transistors 402. A respective integrated or combined gate termination arrangement 404G is connected between the gate terminals of adjacent transistors 402, to couple adjacent transistor 402 or adjacent oscillators. The integrated or combined gate termination arrangement 404G includes a generally T-shaped transmission line connected to ground via a capacitor. The generally T-shaped transmission line has an AC shorted end to which a gate bias voltage $V_G$ can be applied (example location shown in FIG. 4A for one of the integrated or combined gate termination arrangement 404G; also applicable to other integrated or combined gate termination arrangements 404G). The generally T-shaped transmission line generally elongates along direction D. The source terminal of each transistor 402 is connected with a source termination arrangement 404S, which includes a substantially straight transmission line connected to ground and a capacitor connected to ground. The substantially straight transmission line generally elongates along direction D. The drain terminal of each transistor 402 is connected with a drain termination arrangement 404D, which includes a transmission line arrangement with a substantially M or W shape in plan view. The transmission line arrangement of the drain termination arrangement 404D includes two substantially straight feed lines generally elongating along direction D, and a substantially straight transmission line disposed between the two feed lines and generally elongating along direction D. The feed lines have generally the same length and are longer than the substantially straight transmission line. The substantially straight transmission line is connected to ground via a capacitor. The substantially straight transmission line has an AC shorted end to which a supply voltage $V_D$ can be applied (example location shown in FIG. 4A for only one of the drain termination arrangement 404D; also applicable to other drain termination arrangements 404D). The feed lines are capacitively coupled to the patch arrangement 404. The feed lines and the substantially straight transmission line are connected at their base via a transmission line portion. Generally, in this embodiment, the integrated or combined gate termination arrangement 404G, the source termination arrangement 404S, and the drain termination arrangement 404D all include transmission line arrangements that, in plan view, generally elongate along the same direction D (i.e., mainly extend or elongated in direction D). In some embodiments, the transistor may also include a buck terminal and a buck termination arrangement electrically connected to the buck terminal. The buck termination arrangement may include a grounded resistor arrangement.

In this embodiment, the coupled oscillators of the radiator 400 are based on the design of FIG. 3. Thus, in this embodiment, the integrated or combined gate termination arrangement 404G may correspond to two gate termination arrangements for two adjacent transistors in FIGS. 2 and 3. Also, the integrated or combined gate termination arrangement 404G may provide an inductance at fundamental frequency, the source termination arrangement 404S may be operable to provide a capacitance at fundamental frequency, and the drain termination arrangement 404D may be operable to provide an inductance at fundamental frequency, all of which cooperate to facilitate generation of third harmonic power.

The radiator 400 implemented based on the design of FIG. 3 is compact. In the radiator 400, the horizontal adjacent oscillator spacing is about 30 μm. The total number of oscillators electrically coupled in parallel is 10. These oscillators are arranged to oscillate in phase at fundamental frequency $f_0$. In the radiator 400 there are two sets of such oscillators. The total length of the oscillator arrangement is 300 μm, which is smaller than $\lambda_r/2$(366 μm), where $\lambda_r$, is the wavelength in the dioxide layer at $f_0$ (205 GHZ). In some embodiments, increasing the number of oscillators coupled in parallel may lead to undesired coupling modes due to the distributed effect of the transmission line.

The radiator 400 in this embodiment is arranged to extract the third harmonic ($3f_0$) from the transistors and then radiate terahertz electromagnetic radiation using an on-chip patch antenna. In this embodiment, as the spacing between adjacent oscillators is relatively small, the shared aperture patch antenna is adopted. Also, the side couplers 406A, 406B are used to out-of-phase couple the two sets of oscillators so that the third harmonic can differentially excite the patch antenna for area reduction and double the output power.

Figure 5B:
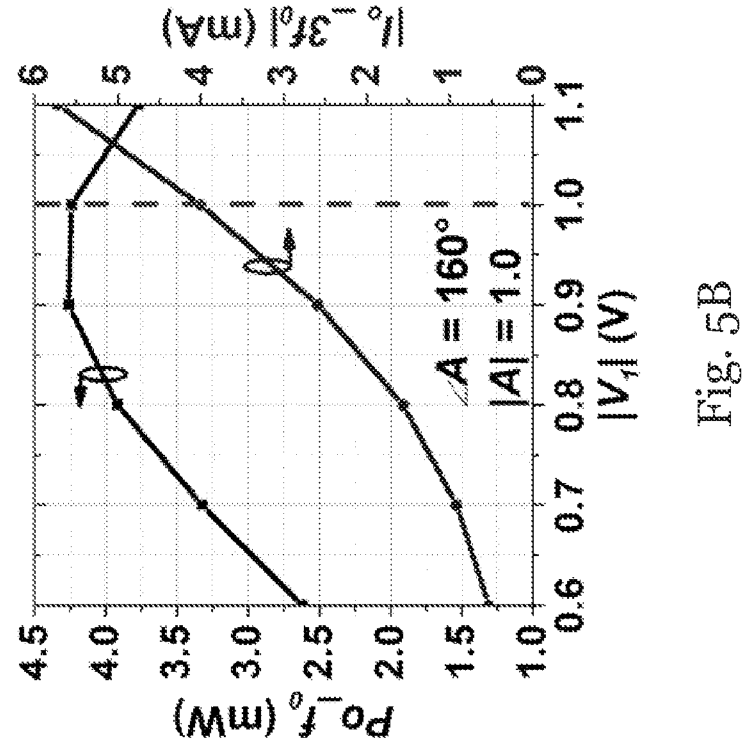
FIG. 5B is a graph showing simulated net fundamental output power $Po\_f_0$ and third harmonic current $|I_o\_3f_0|$ when $|V_1|$ in the simulation arrangement in FIG. 5A varies from 0.6 V to 1.1V ($\varphi$=160° and $|A|$=1) in one example.
Figure 5A:
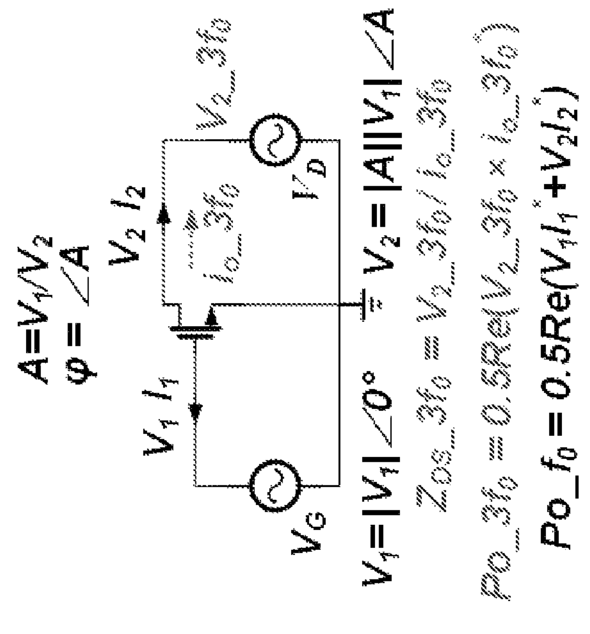
FIG. 5A is a schematic circuit diagram illustrating a simulation setup for determining optimum design condition for an oscillator in the radiator of FIG. 4A in one example.
Figure 5D:
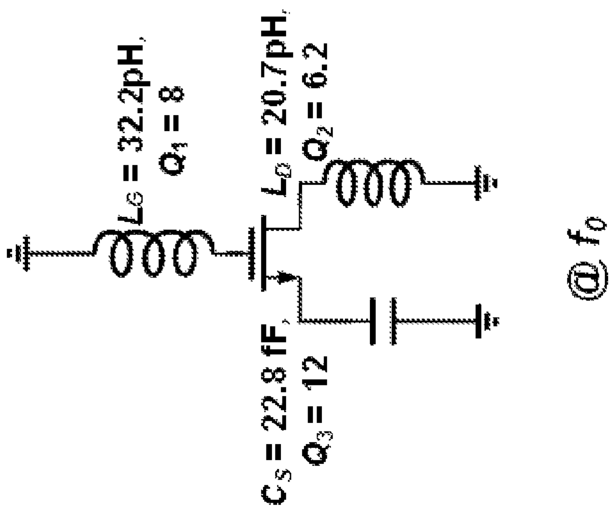
FIG. 5D is a schematic circuit diagram illustrating an AC equivalent circuit of a synthetized oscillator (with determined component values and quality factors) in one example.
Figure 5C:
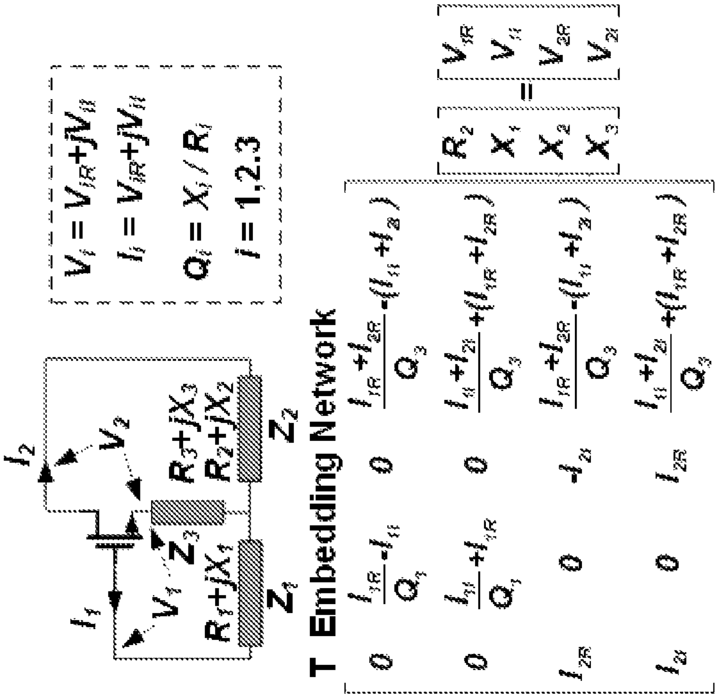
FIG. 5C is schematic diagram illustrating a T-embedding-network based oscillator topology and a formula for determining various associated component values and quality factors in one example.

Synthesis and design of a unit oscillator of the radiator 400 is now described. In this embodiment, the core oscillator synthesis method used is based on that disclosed in L. Gao et al., A 0.68-0.72-THz 2-D scalable radiator array with −3-dBm radiated power and 27.3-dBm EIRP in 65-nm CMOS (2022), the entire contents of which is incorporated herein by reference. A summary of the design procedure is provided here. In this embodiment, the simulation setup shown in FIG. 5A is used to determine the optimum design condition. Based on L. Gao et al., A 0.68-0.72-THz 2-D scalable radiator array with −3-dBm radiated power and 27.3-dBm EIRP in 65-nm CMOS (2022), the amplitude and phase of voltage gain between the gate and drain should be chosen appropriately to optimize the third harmonic generation. Based on a similar design procedure, the amplitude and phase of the voltage gain are chosen to be 1 and 160° in this embodiment. The quality factors of the components determine the final stable oscillation amplitude. Under the bias condition $V_G$=1.0 V, $V_D$=1.4 V, this embodiment sets the fundamental amplitude at gate $V_1$=1.0 V, which leads to a high net fundamental output power Po_$f_0$, as shown in FIG. 5B. If a higher fundamental amplitude is chosen, the net fundamental output power will decrease, and the generated third harmonic current will increase, as shown in FIG. 5B. Under the chosen condition, the required component values and quality factors can be calculated using the formula provided in L. Gao et al., A 0.68-0.72-THz 2-D scalable radiator array with −3-dBm radiated power and 27.3-dBm EIRP in 65-nm CMOS (2022), as shown in FIG. 5C. The calculated component values are labeled in FIG. 5D.

Figure 6:
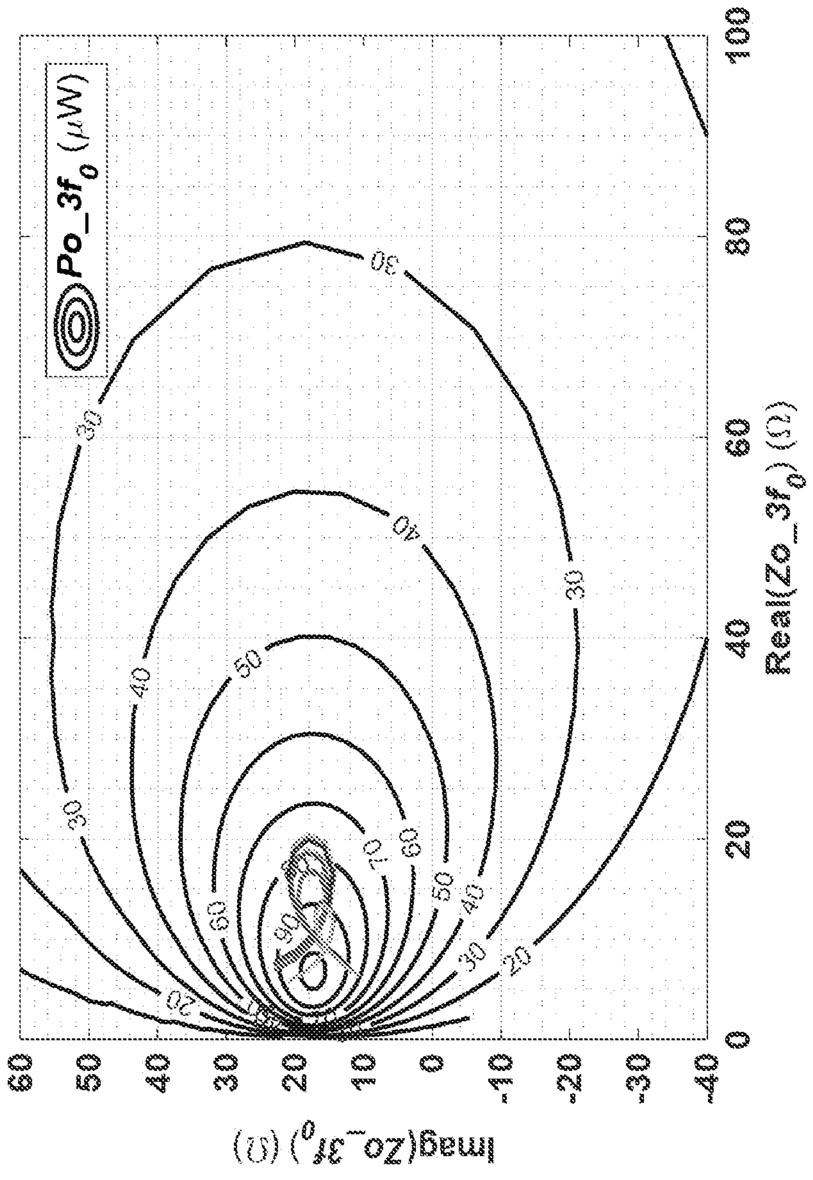
FIG. 6 is a plot (contour map) showing the third harmonic output power $Po\_3f_0$ under different third harmonic load impedance $Z_{DS}\_3f_0$ (with 10-μW step) in one example, superimposed with drain-source impedances for a multi-feed antenna example.

Based on the same setup, by superimposing and varying the third harmonic voltage at the drain of the transistor, the generated third harmonic output power from the transistor can be calculated, as shown in FIG. 5A. The corresponding third harmonic impedance $Z_{DS}$_$3f_0$ loaded between drain and source of the transistor can also be calculated, as shown in FIG. 5A. To ensure the transistor output third harmonic, Po_$3f_0$ should be positive. Then, the harmonic output power versus the third harmonic load impedance $Z_{DS}$_$3f_0$ can be plotted in the contour map in FIG. 6. In this example the optimum $Z_{DS}$_$3f_0$ is determined to be about 5.7+j17.6Ω. To efficiently extract the third harmonic power, the harmonic impedance loaded between the drain and source should match this value, which can be accomplished by a bandwidth extended antenna (details below).

The layout of the design of the radiator 400 is shown in FIG. 4A. Various design details of the radiator have been presented above. In this example, the size of the transistor is W/L=16×1 μm/60 nm. In this example, the buck (body) terminal of the transistor of the oscillator is connected to the ground through a 1k resistor (not shown). As shown in FIG. 4A, in this example, the gate inductor is implemented by the AC shorted transmission line connected to the gate terminal of the transistor. The gate bias voltage $V_G$ is applied to the AC shorted end of the AC shorted transmission line. In this example, as the adjacent two transistors share the gate inductor (the AC shorted transmission line) for coupling, the inductance of the AC shorted transmission line is tuned to twice the calculated value, as illustrated in FIG. 4A. The inductor located at two sides of each set, connected to the out-of-phase coupler (coupling transmission lines 408A 408B), should also be tuned to $2L_G$ to ensure all coupled oscillators oscillate at the same frequency. The transmission line load at the gate is implemented using the AP layer, and the length is tuned in ANSYS HFSS to meet the required inductance. In this example, the source capacitor is realized using a parallel plate capacitor implemented using the M4 metal layer, then connected to a shorted transmission line for connection to the DC ground, as shown in FIG. 4A. As the third harmonic power is extracted from the drain, the component connected to the drain should provide the inductance at $f_0$ and optimum impedance at $3f_0$. In this example, as shown in FIG. 4A, the feed structure is implemented using the M9 metal layer, and the inductance can be easily tuned by changing the length of the shorted transmission line. The supply voltage $V_D$ is fed from the AC shorted end. In this example, the feed structure (feed lines) is capacitively coupled to the patch antenna implemented in the AP metal layer for third harmonic radiation.

In this embodiment, the feed arrangement in the radiator 400 can provide wideband properties (further details below). As the input impedance $Z_S$_$3f_0$ of the structure connected at source at $3f_0$ is about 0.9−j9.3, the input impedance of the patch antenna $Z_D$_$3f_0$ is tuned to about 4.8+j26.9 to satisfy the optimum drain-source impedance $Z_{DS}$_$3f_0$ for maximum power extraction in this embodiment.

In one embodiment, a bandwidth extended differentially-fed shared aperture patch antenna can be applied in the radiator 400. In the embodiment of FIG. 4A, the coupled oscillators are placed closely, hence can feed the shared aperture patch antenna for power combining. The patch antenna can be differentially fed to exploit the power-combining capability of the patch antenna for high area efficiency.

In L. Gao et al., A 0.68-0.72-THz 2-D scalable radiator array with −3-dBm radiated power and 27.3-dBm EIRP in 65-nm CMOS (2022), the input impedance of the antenna does not match the optimum impedance for high third harmonic extraction, thus reducing the output power and total dc-to-THz conversion efficiency. This embodiment of the present invention addresses this problem in Gao and extends the matching bandwidth. At the resonant frequency, the equivalent circuit of a patch antenna is a parallel resonator. The high-quality characteristic of the on-chip patch antenna will lead to high input impedance at the resonant frequency, which makes it challenging for wideband impedance matching. In this embodiment, a simple and compact feed structure is provided. The feed structure can realize good impedance matching and extend the matching bandwidth.

The feed structure is shown in FIG. 4A. As explained, the AC shorted transmission line is used for providing inductance for fundamental oscillation and DC supply. Two parallel feed lines are capacitively coupled to the patch antenna for the third harmonic radiation.

To illustrate the impedance matching procedure, a single differentially-fed patch antenna is used as an example below. A skilled person appreciates that a similar optimization process can be applied to the multi-feed case.

Figure 7B:
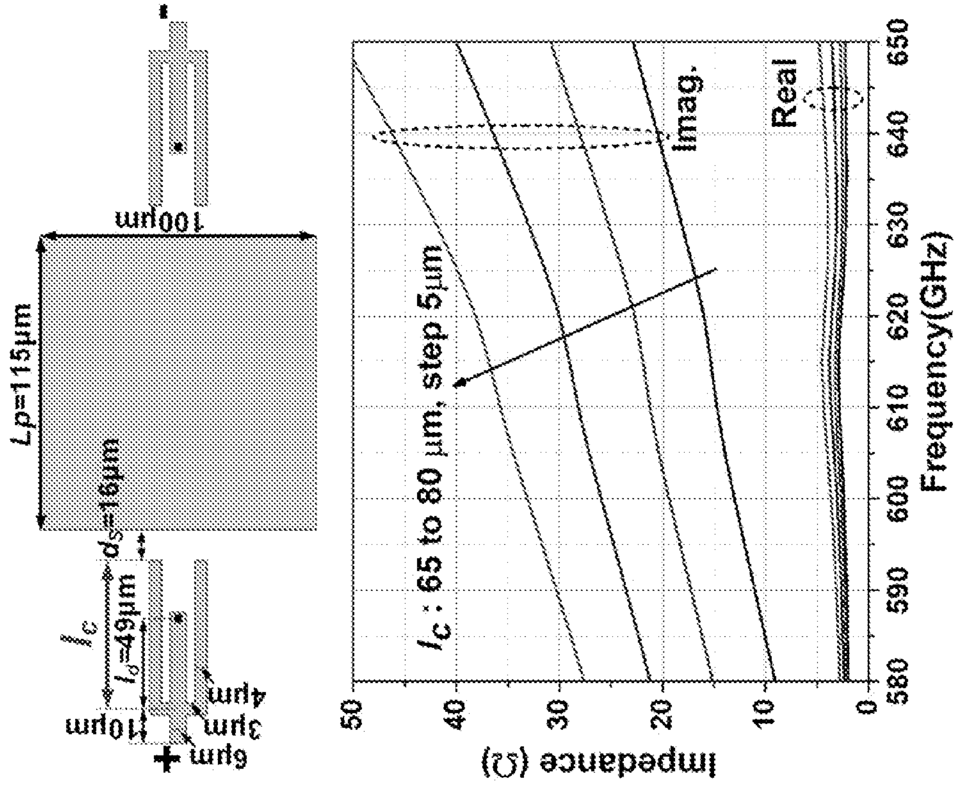
FIG. 7B is a schematic diagram and associated graph illustrating tuning of length $l_c$ of the feed line in the drain termination arrangement to determine a required input impedance at $3f_0$ in the impedance matching procedure in one example.
Figure 7A:
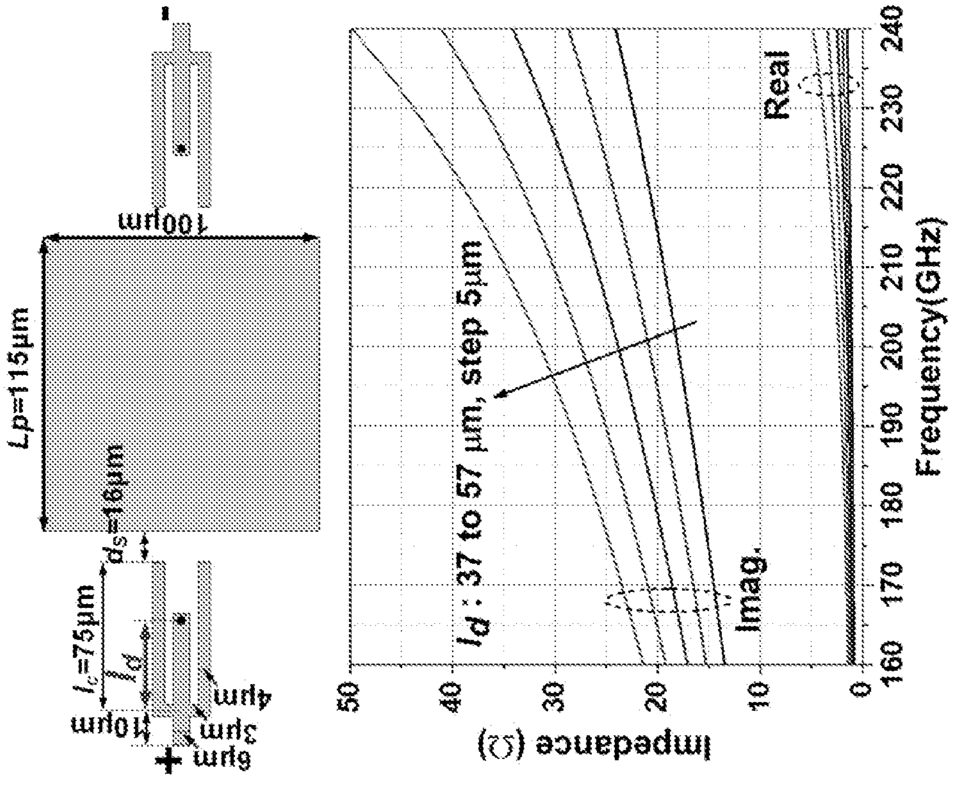
FIG. 7A is a schematic diagram and associated graph illustrating tuning of length $l_d$ of the transmission line in the drain termination arrangement to determine a required input impedance at $f_0$ in an impedance matching procedure in one example.

As shown in FIG. 7A, the length $l_d$ of the transmission line is firstly determined to provide the required inductance at $f_0$. The length $l_c$ of the feed line has a greater impact on the input impedance at $3f_0$ but has less effect on the input impedance at $f_0$. FIG. 7B verifies that tuning the length $l_c$ of the feed line can effectively change the input impedance of the patch antenna at $3f_0$. The length $l_c$ of the feed line is chosen to make the input impedance inductive at $3f_0$ so that it can resonate with the capacitance in the transistor. In this example, the length $L_P$ of the patch antenna is chosen to be 115 μm so that it can also resonate at about $3f_0$. Both resonances will create a wideband response for power delivering from the transistor to the patch antenna by controlling the capacitive coupling strength, which is accomplished by changing the spacing $d_s$ between the feed line and the patch arrangement of the patch antenna.

Figure 7C:
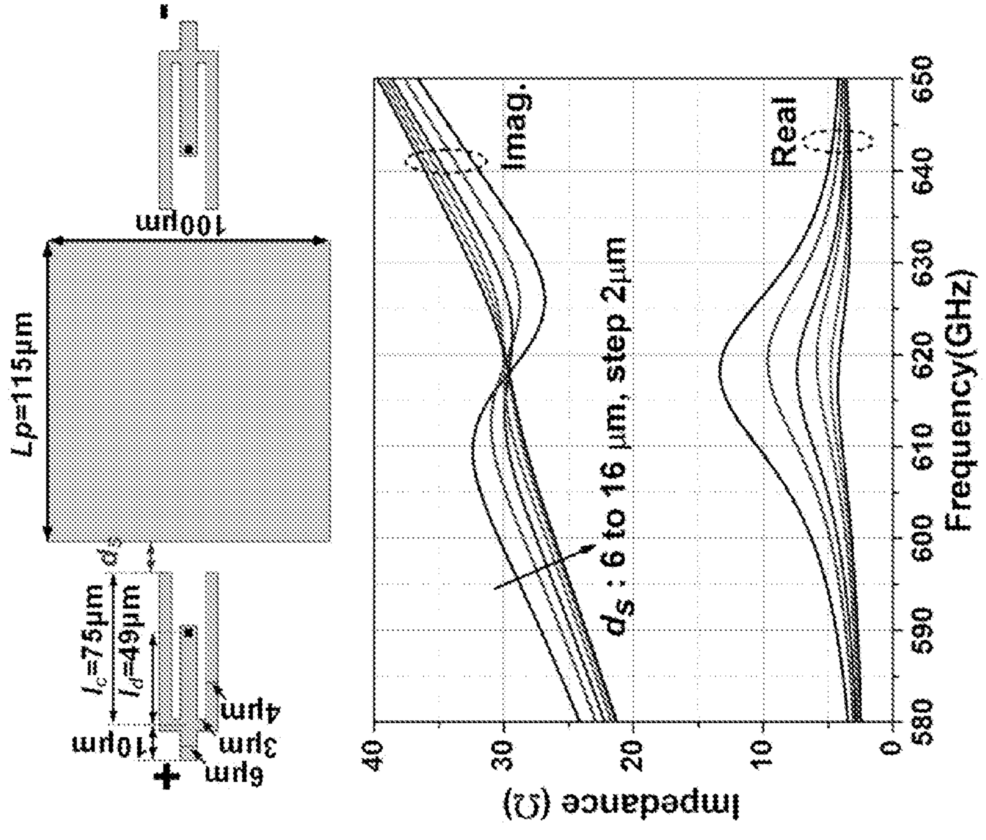
FIG. 7C is a schematic diagram and associated graph illustrating tuning of spacing $d_s$ between the feed line in the drain termination arrangement and the patch arrangement of the patch antenna for wideband input impedance at $3f_0$ in the impedance matching procedure in one example.
Figure 7D:
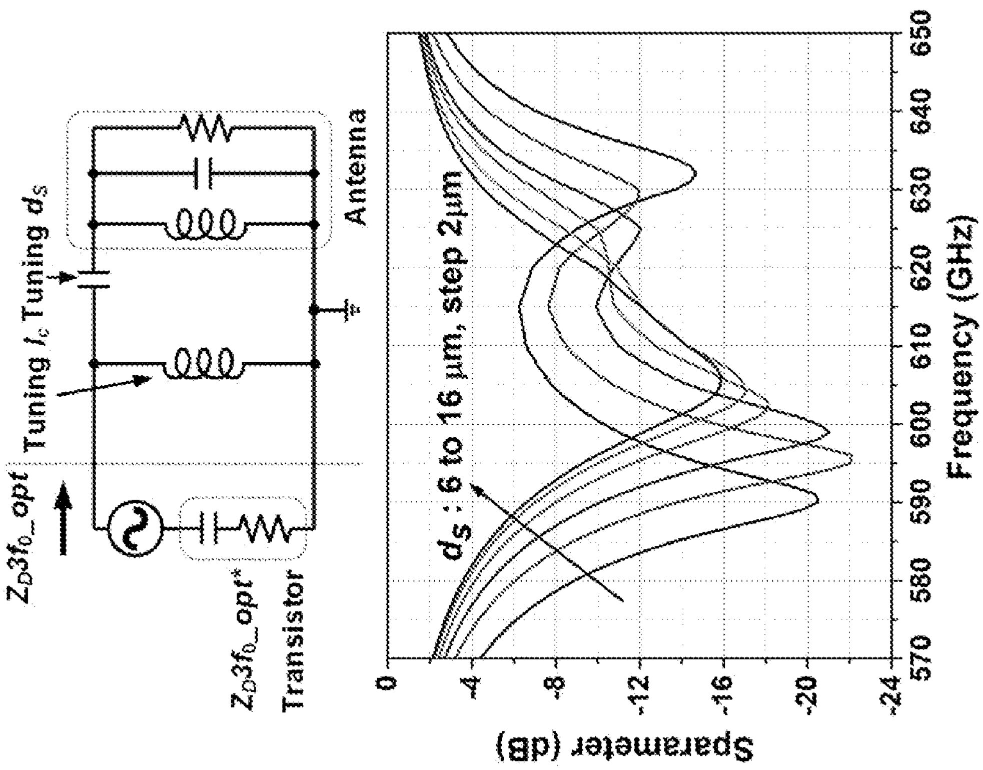
FIG. 7D is a schematic diagram and associated graph illustrating an equivalent circuit and the corresponding S parameter of the patch antenna when connected to the transistor at $3f_0$ in one example.

FIG. 7C shows the input impedance of the patch antenna at $3f_0$. It can be seen that by controlling the coupling strength, the impedance curve will become flattened due to the resonance of the patch antenna, implying a wideband response. The equivalent circuit of the feed structure and the patch element is shown in FIG. 7D. The internal impedance of the transistor at $3f_0$ is modeled as the complex conjugate of the optimum impedance required for maximum third harmonic extraction. Tuning the length $l_c$ of the feed line is equivalent to changing the equivalent parallel inductor shown in FIG. 7D. Tuning the spacing $d_s$ between the feed line and the patch arrangement of the patch antenna is equivalent to changing the coupling capacitor in FIG. 7D By connecting the patch antenna to the transistor, the corresponding return loss at $3f_0$ is shown in FIG. 7D for different $d_s$, and the bandwidth extension effect can be clearly observed.

Figure 8A:
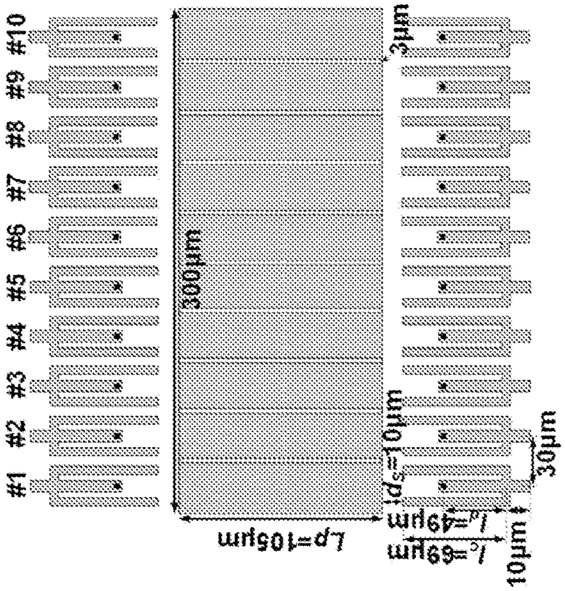
FIG. 8A is a schematic diagram illustrating determined parameter values for some of the components of the radiator of FIG. 4A in one example.
Figure 8B:
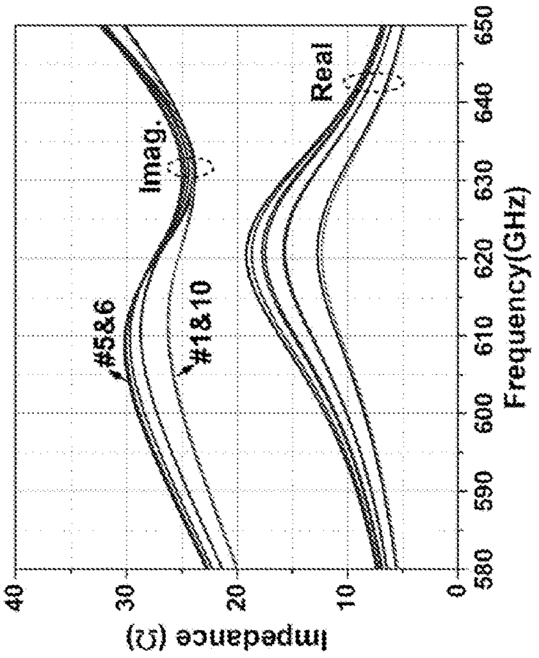
FIG. 8B is a graph showing simulated input impedance of different feed positions (#1 to #10) of the radiator illustrated in FIG. 8A at different frequencies in one example.
Figure 8C:
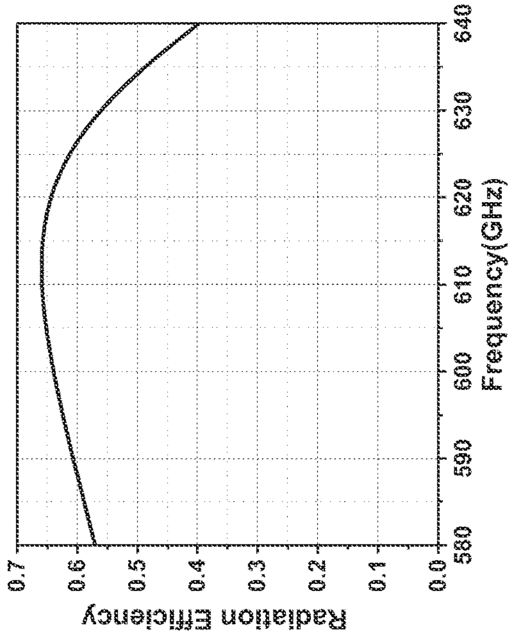
FIG. 8C is a graph showing simulated radiation efficiency of the radiator at different frequencies in one example.

Based on the described optimization procedure of the single-feed case, the design parameters of the multi-feed shared aperture patch antenna in one example can be similarly determined. FIG. 8A illustrates the values of these parameters in one example. As shown in FIG. 8A, in this embodiment, multiple 3-μm width slots are cut on the patch element to satisfy the design rule check (DRC) of the AP layer. These slots have little effect on the performance. The input impedances at the different feed positions #1 to #10 are shown in FIG. 8B. It is found that the impedances for the central feeds (e.g., #5, #6) and the impedances for the lateral feeds (e.g., #1, #10) are not the same. These curves are further plotted on the contour map in FIG. 6, after including the impedance $Z_{S}\_3f_0$ loading at the source terminal. The output power variation is found to be acceptable (generally within 80% of the peak) in a wide frequency range for different feed positions. Increasing the total width of a patch antenna can improve radiation efficiency. The simulation results in FIG. 8C indicate that the design in this example has good efficiency due to the long width of the patch.

Figure 9:
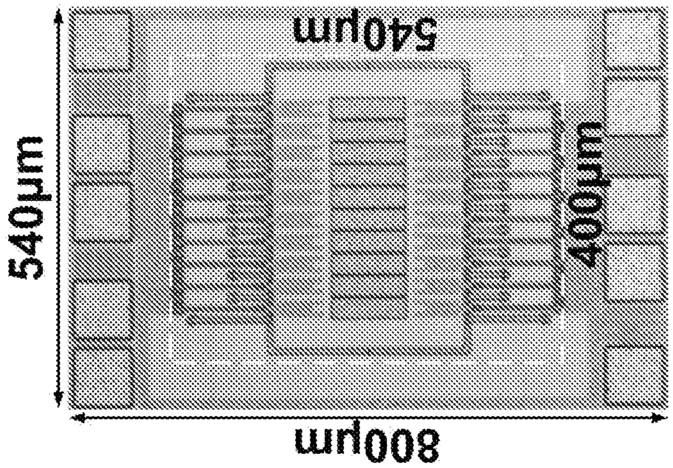
FIG. 9 is a micrograph of a chip incorporating a radiator for providing terahertz electromagnetic radiation (based on the design of FIG. 4A) in one embodiment of the invention.

A chip based on the above design and incorporating the radiator 400 is fabricated using 65-nm CMOS technology. FIG. 9 shows the micrograph of the fabricated chip, which has a core area of 0.4 mm×0.54 mm and a total area of 0.54 mm×0.8 mm.

The chip is characterized with or without a lens. Similar to the disclosure in L. Gao et al., A 0.47-THz ring scalable coupled oscillator-radiator array with miniature patch antennas (2022), a polytetrafluoroethylene (PTFE) lens can be placed above the chip to boost the directivity due to the use of the patch antenna for front-side radiation.

Figure 10:
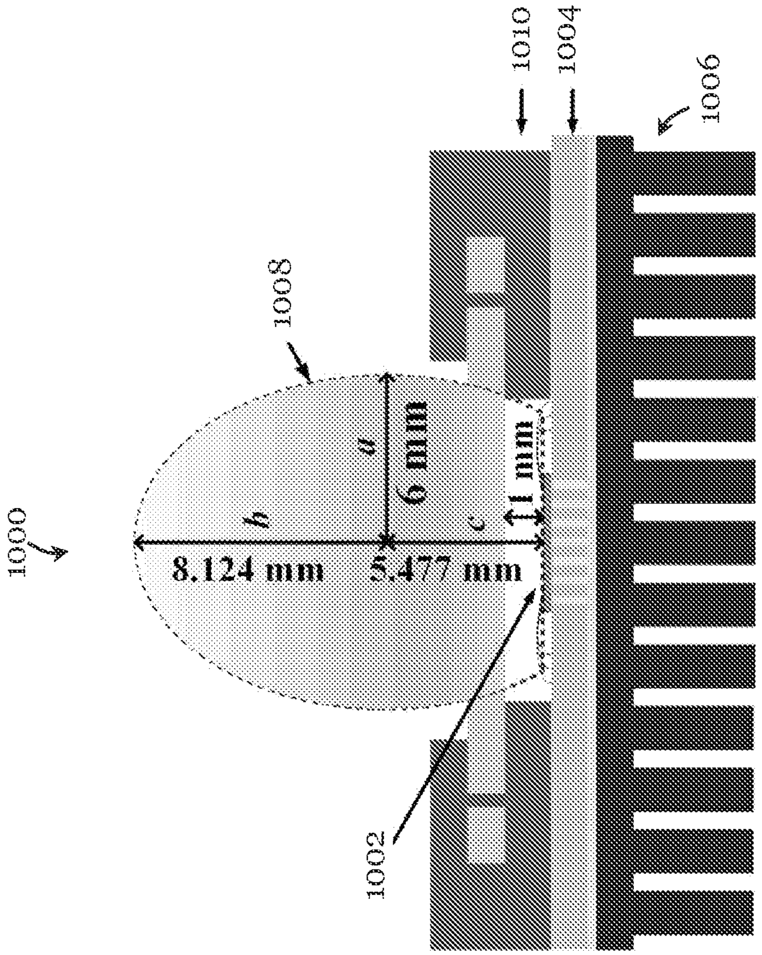
FIG. 10 is a schematic diagram illustrating a package configuration including the chip of FIG. 9 and a polytetrafluoroethylene (PTFE) lens (Teflon lens) in one example.

FIG. 10 shows an example device 1000 configuration including the chip of FIG. 9. As shown in FIG. 10 the device 1000 includes the chip 1002 (the chip of FIG. 9) supported on a substrate 1004, which, in this example is a PCB. The substrate is further coupled with a thermal management device 1006, on an opposite side relative to the chip 1002. The thermal management device 1006 thermally couples with the chip 1002 via the substrate 1004 for regulating temperature of (e.g., facilitate cooling of) the chip 1002 and/or the substrate 1004. The thermal management device 1006 in this example is a passive heat sink with fins. The device 1000 also includes a lens 1008 disposed relative to the chip 1002 for affecting (e.g., boosting) directivity of the terahertz electromagnetic radiation provided or radiated by the chip 1002. The lens 1008 in this example is a polytetrafluoroethylene (PTFE) lens with a part-ellipsoidal (e.g., truncated ellipsoidal) boundary surface. The lens 1008 is supported above the chip 1002 by a support structure 1010, which may be additively manufactured.

Figure 11:
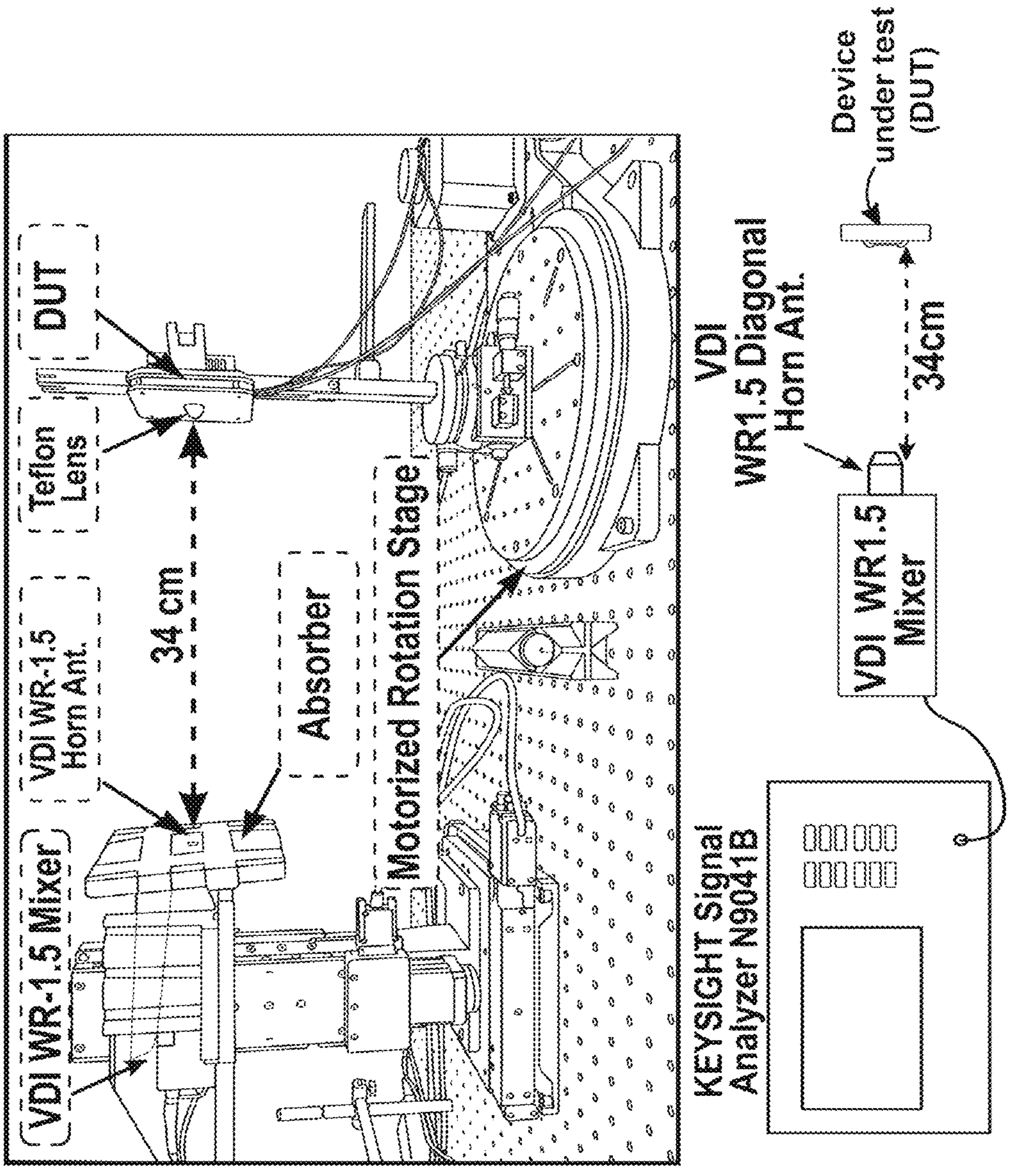
FIG. 11 is a picture and schematic diagram illustrating a measurement setup for characterizing frequency and radiation pattern of the chip of FIG. 9 (using the package configuration of FIG. 10, with or without lens) in one example.

FIG. 11 shows the measurement setup used for frequency and radiation pattern characterization of the chip of FIG. 9 arranged in the device 1000 of FIG. 10 (as device under test DUT, with or without the lens 1008). In this setup, the device 1000 (DUT) is mounted on a stand on a motorized rotation stage. The device 1000 is aligned with a VDI WR1.5 diagonal horn antenna that receives the radiated signal from the chip. The received THz signal is down-converted by a VDI WR1.5 SAX which is connected to a KEYSIGHT N9041B signal analyzer.

Figure 12:
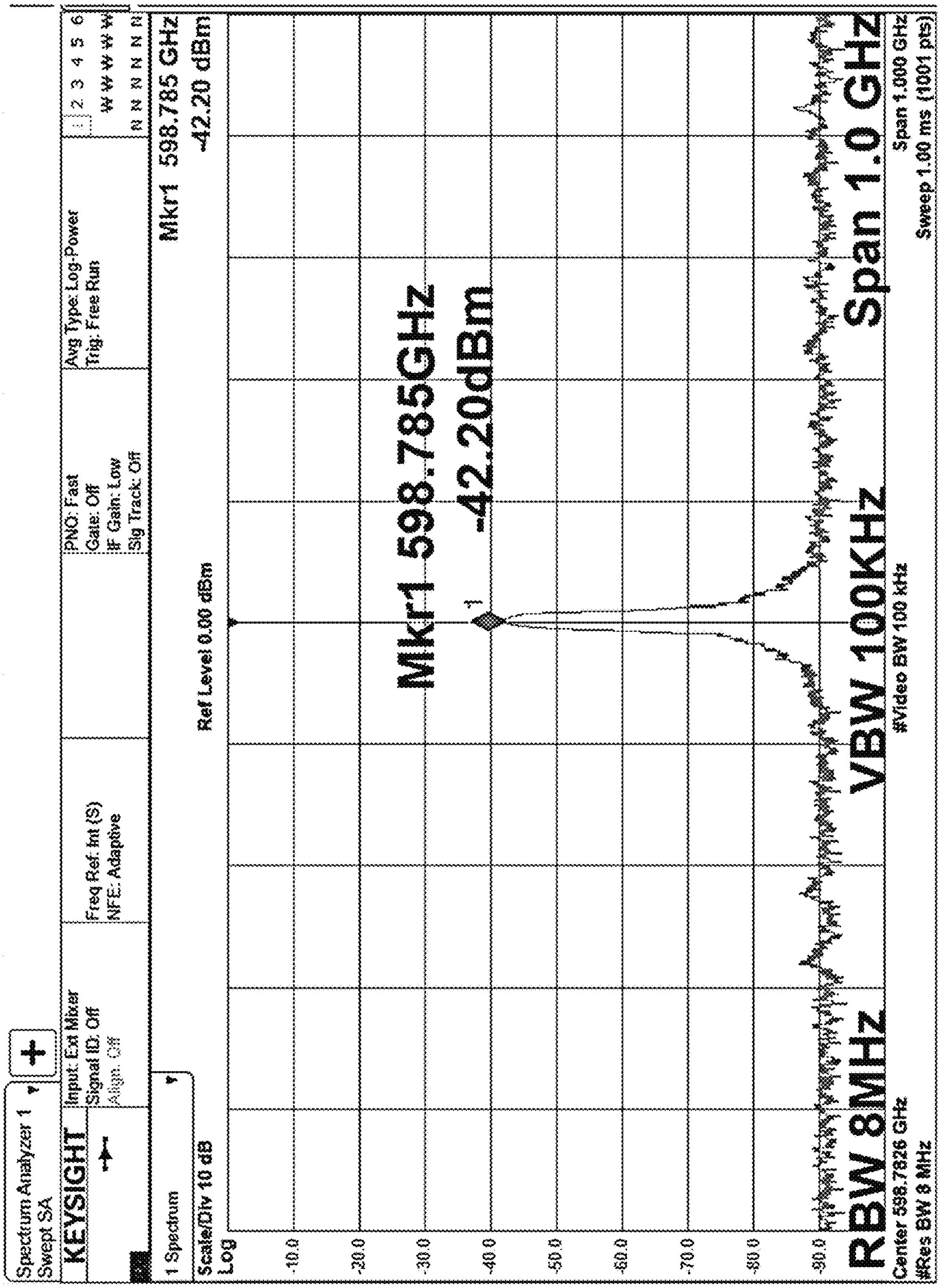
FIG. 12 is a plot illustrating a measured spectrum at 598.8 GHz in one example.
Figure 13:
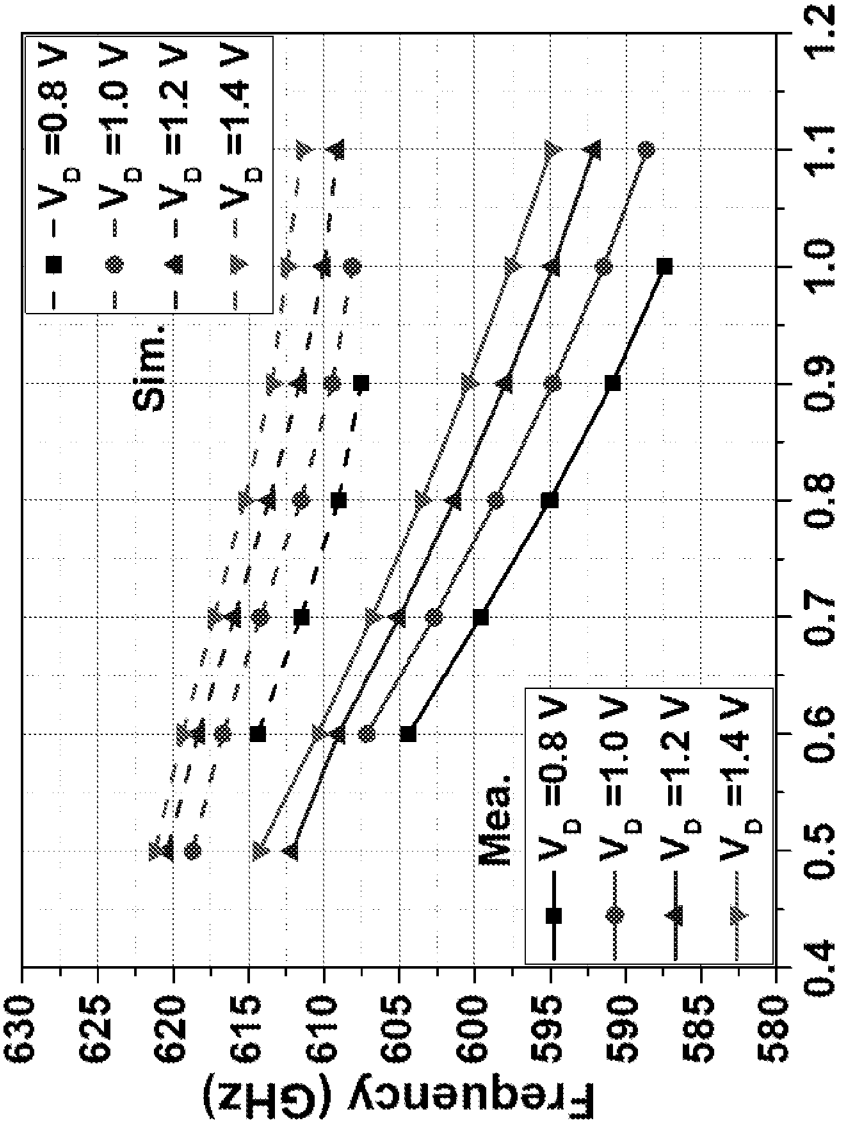
FIG. 13 is a graph showing simulated and measured frequency tuning range, with the output frequency tuned by changing the bias voltage VG and supply voltage VD in one example.

FIG. 12 displays the measured spectrum at 598.8 GHz in one example. The output frequency is tuned by changing the bias voltage $V_G$ and supply voltage $V_D$ as shown in FIG. 13, covering 584.8 GHz to 614.3 GHZ (4.9%). The simulated results are also shown in FIG. 13. Inaccurate modeling of the active and passive components may lead to frequency error.

In this example, the receiving horn antenna is located 34 cm away from the chip, which is in the far-field region of the chip with and without the lens. The normalized measured power for the chip with the lens at different locations is compared with the Friis equation in FIG. 14A, which confirms that the chip is located in the far-field region.

Figure 14B:
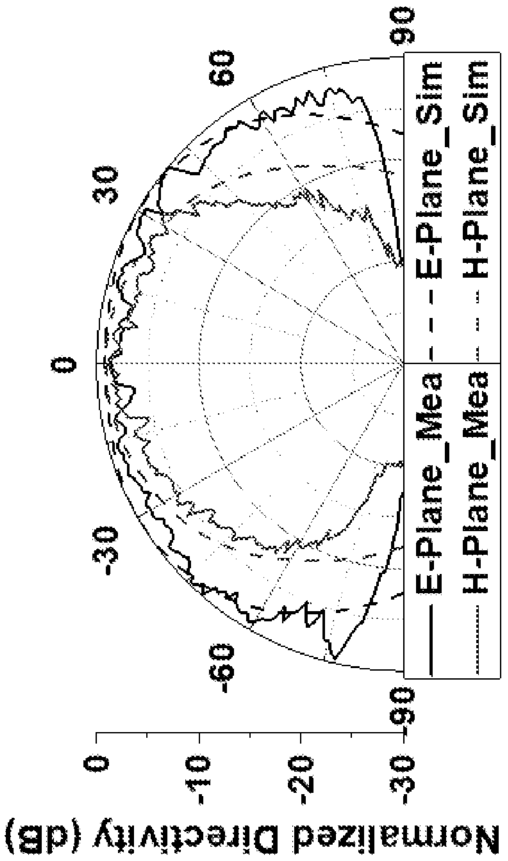
FIG. 14B is a plot illustrating simulated and measured radiation patterns of the chip (without lens) at 600 GHz in one example.
Figure 14A:
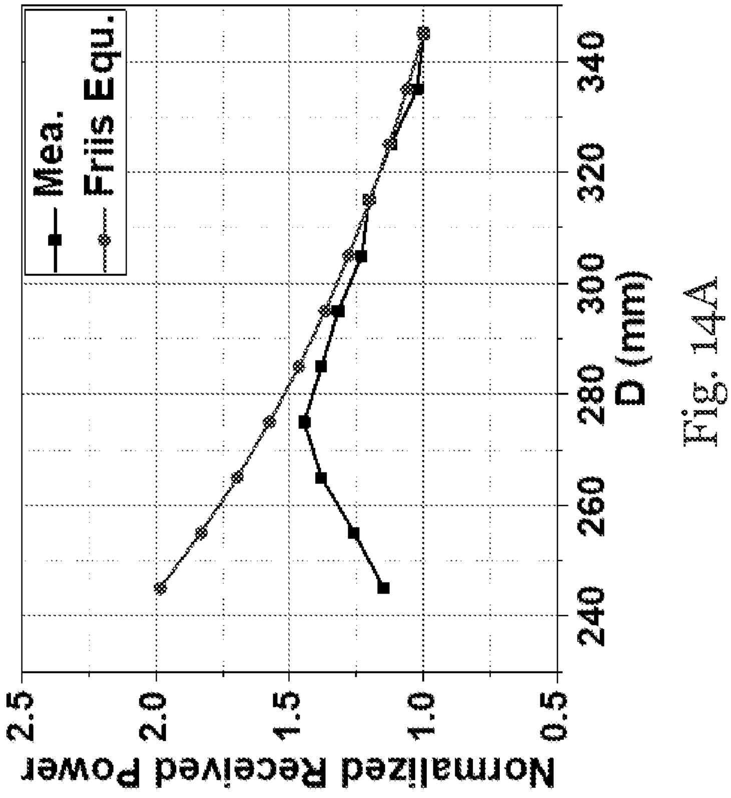
FIG. 14A is a graph showing measured normalized received power at different distances D between the chip (with lens) and the receiving horn antenna, and a corresponding plot based on the Friis equation in one example.

The motorized rotation stage in the setup of FIG. 11 is used to facilitate measurement of the radiation patterns provided by the chip (with or without lens included in the device 1000). In this example E-and H-plane radiation patterns are measured in 0.5° or 1° steps for the case with or without the lens. The simulated and measured radiation patterns at 600 GHz without the lens are shown in FIG. 14B, and they match well. Several radiation patterns at different frequencies are also measured and used for directivity calculation. Based on the method disclosed in Han et al., A CMOS high-power broadband 260-GHz radiator array for spectroscopy (2013), the directivity in the broadside direction can be calculated based on the measured two-plane patterns. The calculated average broadside directivity from multiple frequencies is 6.3 dBi, which is about 0.7 dBi higher than the simulated value. This error is not unexpected because the directivity calculation using only two planes with different beamwidths only provide a rough estimation of the average directivity of the measured two planes. A more accurate result requires more measured planes or symmetric radiation patterns. The calculated value may lead to an underestimated radiated power.

Figure 15B:
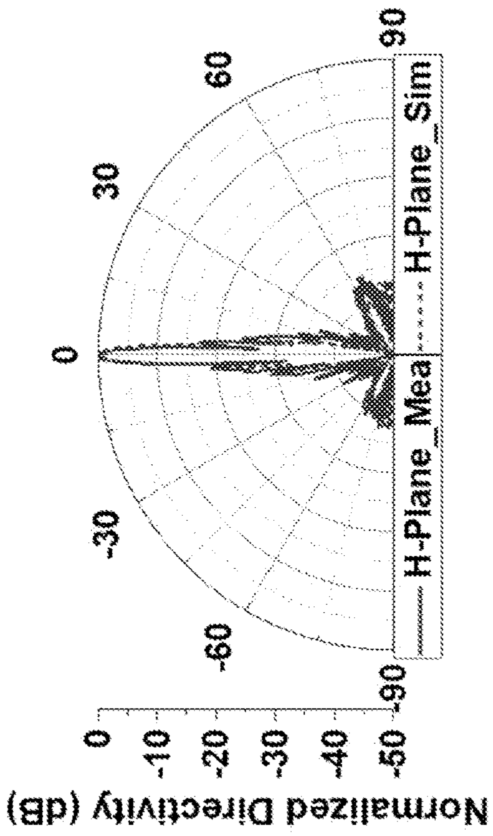
FIG. 15B is a plot illustrating simulated and measured H-plane radiation patterns of the chip (with lens) at 600 GHz in one example.
Figure 15A:
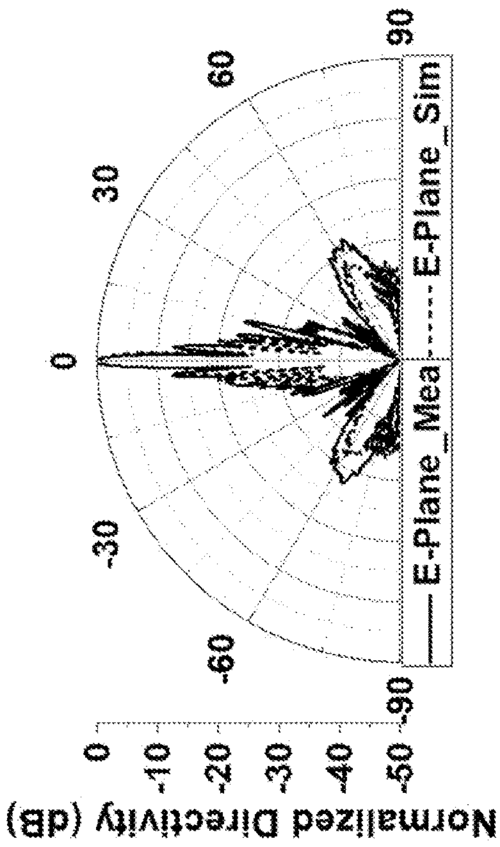
FIG. 15A is a plot illustrating simulated and measured E-plane radiation patterns of the chip (with lens) at 600 GHz in one example

FIGS. 15A and 15B show the simulated and measured radiation patterns with the lens, and they are in good agreement. The E-and H-plane patterns are also close (similar) due to the use of the symmetric lens, and the calculated broadside directivity using the measured two planes should be more accurate. The calculated directivity is 35.15 dBi, close to the simulated value of 35 dBi.

Figure 16:
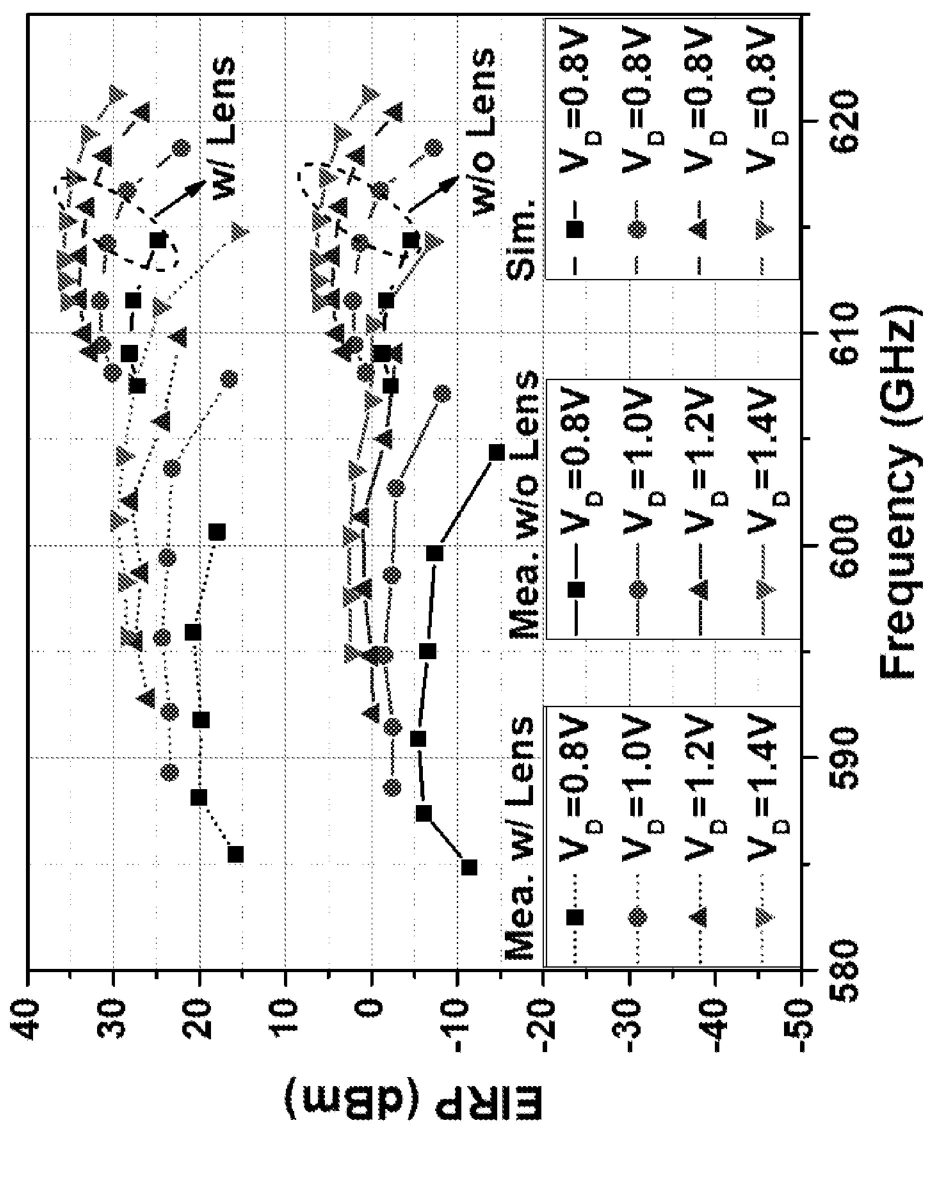
FIG. 16 is a graph showing simulated and measured equivalent isotropically radiated power (EIRP) of the chip (with and without lens) at different frequencies in one example.

The total loss, including path loss and conversion loss of VDI WR1.5 SAX calibration method, is generally the same as that disclosed in L. Gao et al., A 0.68-0.72-THz 2-D scalable radiator array with −3-dBm radiated power and 27.3-dBm EIRP in 65-nm CMOS (2022). Following the procedures disclosed in this Gao publication, the calibrated total loss can be obtained. The EIRP (in dBm) can be calculated by taking the sum of the calibrated total loss and the received power from the chip measured by the spectrum analyzer. The simulated and measured EIRP of the chip with or without the lens at different frequencies are shown in FIG. 16.

Figure 17:
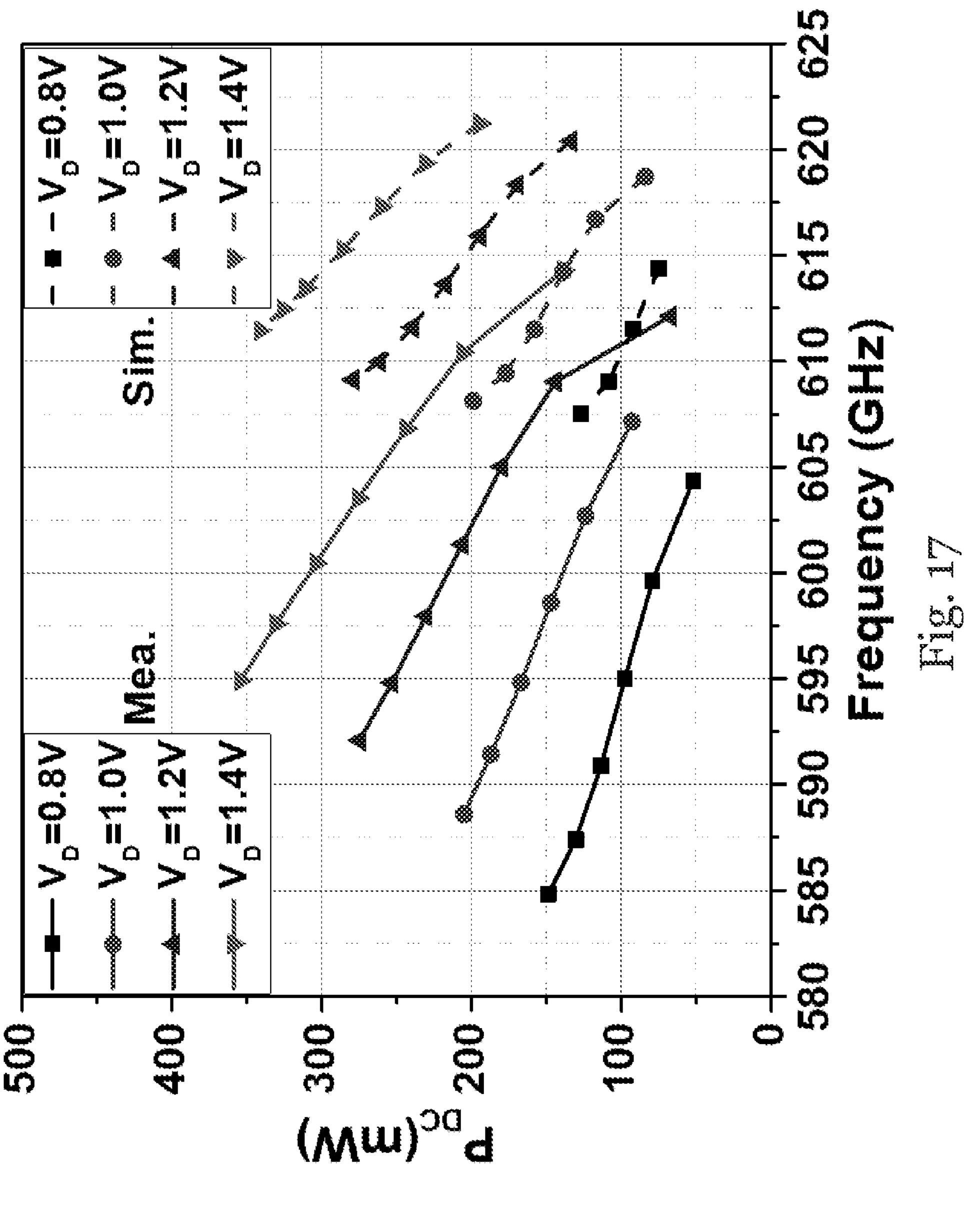
FIG. 17 is a graph showing corresponding simulated and measured DC power consumption of the chip at different frequencies in one example.

FIG. 17 shows the corresponding simulated and measured DC power consumptions. It can be found that the EIRP improvement is significant by adding the lens, and output EIRP is boosted as supply voltage $V_D$ increases. Under $V_D$=1.4 V, a peak broadside EIRP of 2.5 dBm is measured at 600.5 GHz with 303.8-mW power consumption without the lens. The peak broadside EIRP is boosted to 29.6 dBm at 601.2 GHz by adding the polytetrafluoroethylene (PTFE) lens.

than the simulated value, which may come from the inaccurate modeling of the loss in the active and passive components.

Figure 19:
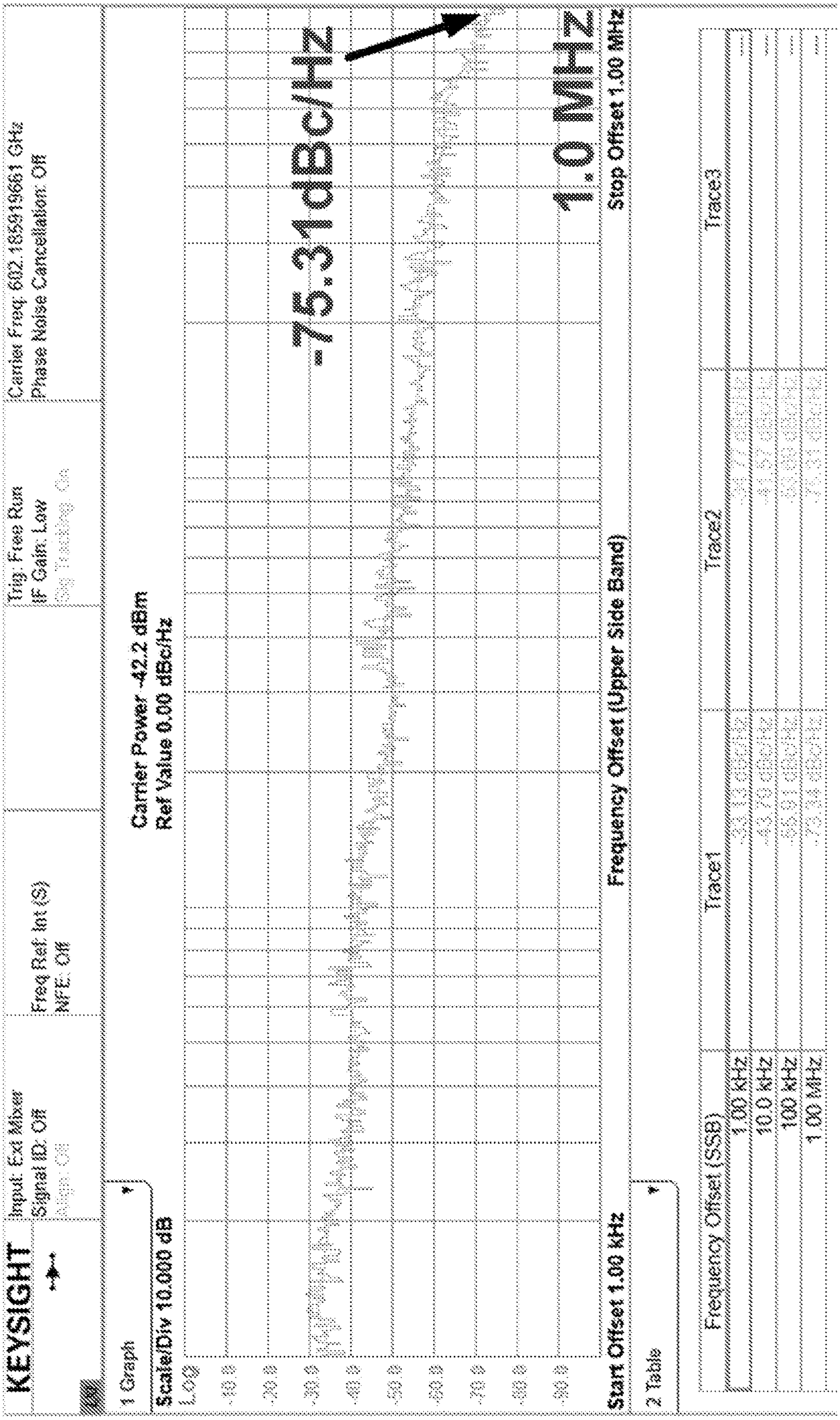
FIG. 19 is a plot illustrating the measured phase noise at 602.2 GHz in one example.

FIG. 19 shows the measured phase noise at 602 GHz in one example. At the 1-MHz offset, the phase noise is −75.3 dBc/Hz.

The above embodiments of the invention realize an area-efficient radiation source by using wideband differentially-fed shared aperture patch antenna and high-density parallel coupled oscillators. In the embodiments, the oscillator is designed to optimize the third harmonic generation, and the input impedance of the patch antenna can be matched to the optimum impedance in an extended bandwidth for a high-efficiency third harmonic extraction. In the embodiments the high-efficiency signal generation and the compact antenna design lead to the high area efficiency radiation source. The fabricated chip example of FIG. 9 occupies only 0.216 mm$^2$ core area but radiates a peak −3.7 dBm power at 600.5 GHZ, thus achieves a high core area efficiency of 1.95 mW/mm$^2$. The design in these embodiments may also be suitable for feeding an external lens for a high directive beam. As an example a peak EIRP of 29.6 dBm is measured by adopting a 12-mm diameter elliptical Polytetrafluoroethylene (PTFE) lens.

The features and characteristic parameters of the radiator and chip in this embodiment are listed in Table I. It can be seen that the design in this embodiment achieves good performances in terms of dc-to-THz efficiency, area efficiency, and EIRP beyond 600 GHz. The design in this embodiment can be further coupled to form a 2D array for higher output power and more symmetry E- and H-plane patterns.

TABLE I

Features and characteristic parameters of the radiator and chip in one embodiment of the invention

| Radiating Element & Array Size | | Frequency ($f_o$) (GHz) | Tuning Range (%) | EIRP (dBm) | $P_{rad}$ (dBm) | $P_{DC}$ (W) | DC-to-THz Efficiency (%) |
|---|---|---|---|---|---|---|---|
| Shared aperture Patch antenna | Without lens | 600 (200) 584.8-614.3 | 4.9 | 2.5 (1.4 V) | −3.7 | 0.304 | 0.139 |
| | with lens | | | 29.6 (1.4 V) | −5.5 | 0.298 | 0.094 |

| Λ {X MHz} (dBc/Hz) | Area (mm$^2$) | $P_{rad}$/Area (mW/mm$^2$) | Technology |
|---|---|---|---|
| −75.3 (1 MHz) | 0.216/0.432 Core/Full | 1.95/0.97 Core/Full 1.29/0.646 Core/Full | 65-nm CMOS |

Figure 18:
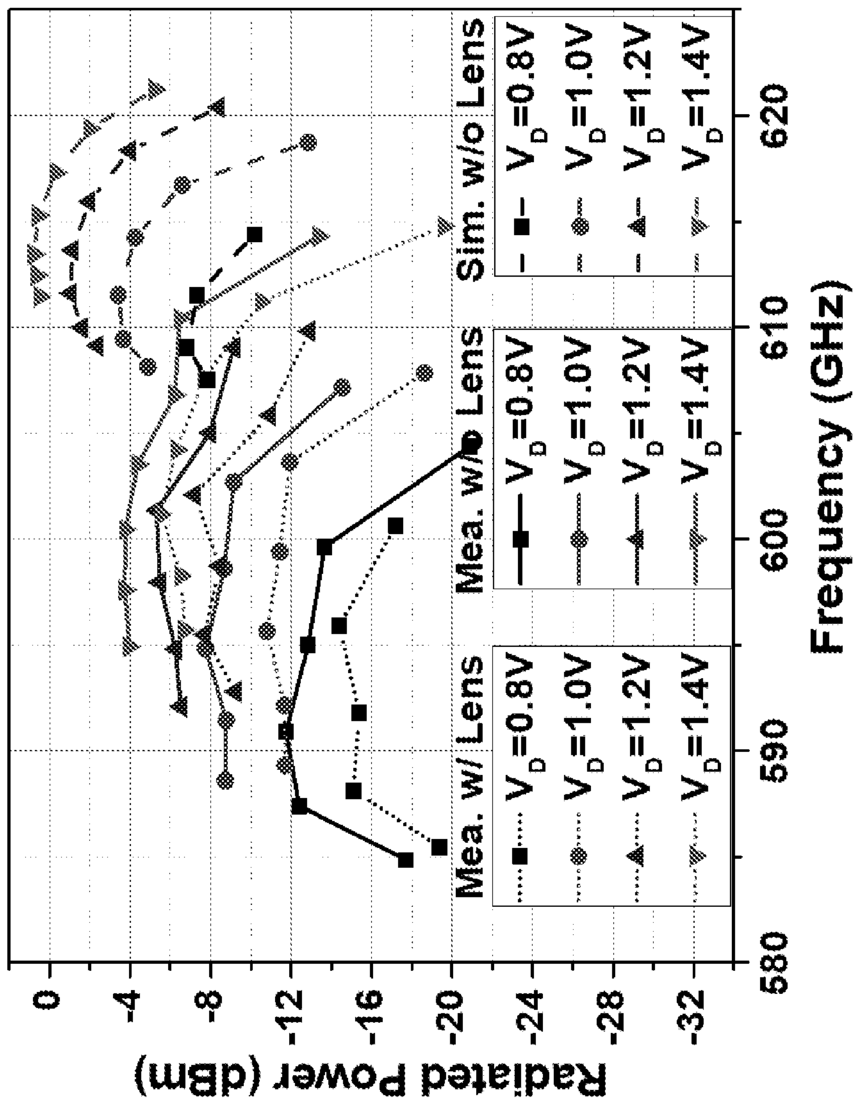
FIG. 18 is a graph showing simulated and measured radiated power of the chip (with and without lens) at different frequencies in one example.

Subtracting directivity (in dB) from the measured EIRP (in dBm) results in radiated power, and the calculated results are shown in FIG. 18. For the lensless case, the peak radiated power is −3.7 dBm at 600.5 GHz, which corresponds to a peak core area efficiency of 1.95 mW/mm$^2$. As mentioned, the calculated directivity is higher than the simulated value even though the simulated and measured patterns match well. Therefore, the calculated radiated power based on measured directivity may be underestimated for the lensless case. The radiated power with the lens is also calculated and shown in FIG. 18. It is found that the power is about 2 dBm lower than the lensless case, which may be caused by the power loss in the lens. The measured radiated power is lower In summary, the invention generally concerns a radiator for providing terahertz electromagnetic radiation. The radiator has multiple transistor-based oscillators each operable to generate third harmonic power and a patch antenna operably coupled with the transistor-based oscillators for providing terahertz electromagnetic radiation based on the third harmonic power generated by the transistor-based oscillators. Some embodiments of the invention provide a differentially-fed shared aperture patch antenna with on-chip power combining and radiation function for a compact terahertz (THz) radiator design. Some embodiments of the invention provide a feed mechanism or method that allows the input impedance of the patch antenna to match well with the transistor over an extended bandwidth for high-efficiency third harmonic extraction. Some embodiments of the invention provide a high-density coupled oscillator topology for feeding the patch antenna for realizing high area efficiency. Some embodiments of the invention provide a single patch-antenna-based radiation source can easily feed a low-cost Teflon lens for high-EIRP radiation. Some embodiments of the invention use low-cost CMOS technology to generate and radiate high-power and high-frequency terahertz signals. Some embodiments of the invention use silicon chip to provide area-efficient terahertz generation.

The radiator, chip, and device in some other embodiments of the invention may not include one or more of the above advantages. The radiator, chip, and device in some other embodiments of the invention may include additional or alternative advantage(s).

For example, the radiator, and associated chip and device, in some embodiments of the invention can be used for terahertz applications like high-speed wireless data transmission, spectroscopy, imaging, radar, etc. For example, the radiator, and associated chip and device, in some embodiments of the invention can be used as part of an active terahertz imaging system to illuminate targeted objects.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings).

The invention claimed is:

1. A radiator for providing terahertz electromagnetic radiation, comprising:

a plurality of transistor-based oscillators each operable to generate third harmonic power, and each respectively comprising:

a transistor including a gate terminal, a drain terminal, and a source terminal;

a gate termination arrangement electrically connected to the gate terminal;

a source termination arrangement electrically connected to the source terminal;

a drain termination arrangement electrically connected to the drain terminal;

a patch antenna operably coupled with the plurality of transistor-based oscillators for providing terahertz electromagnetic radiation based on the third harmonic power generated by the plurality of transistor-based oscillators; and wherein for each respective transistor-based oscillator, the gate termination arrangement, the source termination arrangement, and the drain termination arrangement are electrically connected in a T-type oscillator configuration.

2. The radiator of claim 1, wherein the patch antenna comprises an on-chip patch antenna, and the plurality of transistor-based oscillators are arranged on or in a chip of the on-chip patch antenna.

3. The radiator of claim 1, wherein the plurality of transistor-based oscillators comprise a plurality of coupled transistor-based oscillators.

4. The radiator of claim 3, wherein the plurality of coupled transistor-based oscillators are electrically coupled in parallel.

5. The radiator of claim 1, wherein, for at least some of the transistor-based oscillators:

the gate termination arrangements of adjacent transistor-based oscillators are integrated or combined to form an integrated or combined gate termination arrangement; and the transistors of adjacent ones of the transistor-based oscillators are coupled via respective integrated or combined gate termination arrangement.

6. The radiator of claim 5, wherein the integrated or combined gate termination arrangement comprises:

a grounded capacitor arrangement; and a transmission line arrangement electrically connected between the grounded capacitor arrangement and the gate terminals of two adjacent transistors.

7. The radiator of claim 6, wherein the transmission line arrangement of the integrated or combined gate termination arrangement comprises:

a transmission line including an AC shorted end to which a gate bias voltage can be applied.

8. The radiator of claim 1, wherein the source termination arrangement comprises:

a grounded capacitor arrangement electrically connected with the source terminal of the transistor; and a transmission line arrangement electrically connected with the source terminal of the transistor.

9. The radiator of claim 8, wherein the grounded capacitor arrangement comprises a grounded capacitor; and wherein the transmission line arrangement of the source termination arrangement comprises a grounded transmission line.

10. The radiator of claim 1, wherein the drain termination arrangement comprises a transmission line arrangement electrically connected with the drain terminal of the transistor.

11. The radiator of claim 10, wherein the transmission line arrangement of the drain termination arrangement comprises:

a transmission line including an AC shorted end to which a supply voltage can be applied; and a plurality of feed lines capacitively coupled to the patch antenna.

12. The radiator of claim 11, wherein the plurality of feed lines comprises a first feed line and a second feed line disposed generally in parallel.

13. The radiator of claim 12, wherein the transmission line of the drain termination arrangement is disposed between the first feed line and the second feed line; and wherein the transmission line of the drain termination arrangement, the first feed line, and the second feed line generally elongate along the same direction.

14. The radiator of claim 1, wherein the gate termination arrangement comprises a first transmission line arrangement;

wherein the source termination arrangement comprises a second transmission line arrangement;

wherein the drain termination arrangement comprises a third transmission line arrangement; and wherein the first transmission line arrangement, the second transmission line arrangement, and the third transmission line arrangement are arranged such that in plan view they generally elongate along the same direction.

15. The radiator of claim 5, wherein the plurality of transistor-based oscillators comprise:

a first plurality of coupled transistor-based oscillators operable to oscillate in phase at fundamental frequency; and a second plurality of coupled transistor-based oscillators operable to oscillate in phase at fundamental frequency; and wherein the radiator further comprises a coupling transmission line arrangement coupling the first plurality of coupled transistor-based oscillators and the second plurality of coupled transistor-based oscillators such that the third harmonic power generated by the first plurality of coupled transistor-based oscillators and the third harmonic power generated by the second plurality of coupled transistor-based oscillators are differentially fed to the patch antenna.

16. The radiator of claim 15, wherein for the first plurality of coupled transistor-based oscillators, adjacent ones of the transistors are coupled by respective integrated or combined gate termination arrangement; and wherein for the second plurality of coupled transistor-based oscillators, adjacent ones of the transistors are coupled by respective integrated or combined gate termination arrangement; and wherein the coupling transmission line arrangement comprises:

a first coupling transmission line arrangement coupling one of the first plurality of coupled transistor-based oscillators with one of the second plurality of coupled transistor-based oscillators; and a second coupling transmission line arrangement coupling another of the first plurality of coupled transistor-based oscillators with another of the second plurality of coupled transistor-based oscillators.

17. The radiator of claim 1, wherein the patch antenna comprises a patch arrangement; and wherein, in plan view, the plurality of transistor-based oscillators are disposed around the patch arrangement of the patch antenna.

18. The radiator of claim 17, wherein, in plan view, the plurality of transistor-based oscillators comprise:

a first plurality of transistor-based oscillators disposed on a first side of the patch antenna; and a second plurality of transistor-based oscillators disposed on a second side of the patch antenna opposite the first side.

19. The radiator of claim 18, wherein, in plan view:

the first plurality of transistor-based oscillators are disposed in a first substantially linear array; and the second plurality of transistor-based oscillators are disposed in a second substantially linear array spaced apart from and generally parallel to the first substantially linear array.

20. The radiator of claim 19, wherein the first plurality of transistor-based oscillators and the second plurality of transistor-based oscillators have the same number of transistor-based oscillators; and wherein, in plan view, each one of the first plurality of transistor-based oscillators is aligned with a respective one of the second plurality of transistor-based oscillators.

21. An integrated circuit comprising at least one of the radiator of claim 1.

22. A device for providing terahertz electromagnetic radiation comprising at least one of the radiator of claim 1.

* * * * *